United States Patent [19]

Itoh et al.

[11] Patent Number: 5,206,811
[45] Date of Patent: Apr. 27, 1993

[54] NAVIGATION SYSTEM FOR AUTOMOTIVE VEHICLE

[75] Inventors: Toshiyuki Itoh; Hiroshi Tsuda; Kiyomichi Yamada; Katsuhiko Mizushima; Kouichi Ide, all of Kanagawa, Japan

[73] Assignee: Nissan Motor Company, Limited, Kanagawa, Japan

[21] Appl. No.: 902,425

[22] Filed: Jun. 24, 1992

Related U.S. Application Data

[63] Continuation of Ser. No. 610,246, Nov. 9, 1990, abandoned.

[30] Foreign Application Priority Data

Nov. 10, 1989 [JP] Japan .................. 1-293718

[51] Int. Cl.⁵ .................................. G06F 15/50
[52] U.S. Cl. ............................ 364/449; 364/444; 340/990; 340/995
[58] Field of Search ............. 364/443, 444, 449; 73/178 R; 340/988, 990, 995

[56] References Cited

U.S. PATENT DOCUMENTS

| | | |
|---|---|---|
| 4,646,089 | 2/1987 | Takanabe et al. ............ 340/988 |
| 4,774,671 | 9/1988 | Itoh et al. ................... 340/988 |
| 4,792,907 | 12/1988 | Ikeda et al. ................. 340/995 |
| 4,796,189 | 1/1989 | Nakayama et al. ........... 364/449 |
| 4,937,751 | 6/1990 | Nimura et al. ............... 340/990 |
| 4,989,151 | 1/1991 | Nuimura ...................... 340/990 |

FOREIGN PATENT DOCUMENTS 62-213721 9/1986 Japan .
62-93617 4/1987 Japan .

Primary Examiner—Gary Chin
Attorney, Agent, or Firm—Lowe, Price, LeBlanc & Becker

[57] ABSTRACT

A navigation system for an automotive vehicle includes a map data storage unit. The storage unit stores first known target points and adjoining target points preselected for each of the first target points from the first target points. The storage unit further stores a first data group associated with each of the first target points. Each of the first data groups includes a second data group corresponding to each of the adjoining target points of the corresponding first target point. Each of the second data groups includes an abstract configuration of the corresponding first target point and a travel information required at the corresponding first target point for going to the corresponding adjoining target point. The system selects second target points from the first target points to define a vehicle travel route. The system further selects one of the second data groups based on third and fourth target points selected from the second target points. The third target point is a next forward target point for the vehicle and the fourth target point is one of the adjoining target points of the third target point and positioned forward of the third target point. The third target point is used as the target point and the fourth target point is used as the adjoining target point for identifying the one of the second data groups. The system displays the corresponding travel information along with the abstract configuration of the third target point before the vehicle reaches the third target point.

15 Claims, 19 Drawing Sheets

FIG.7
| BLOCK | A 345 |
|---|---|
| A-1 | 345-020 |
| A-2 | 345-021 |
| A-3 | 345-022 |
| A-4 | 345-277 |
| BLOCK | B 346 |
| B-1 | 346-001 |
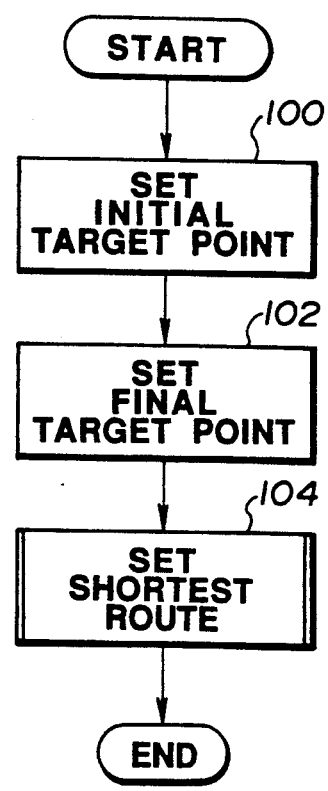
FIG.8
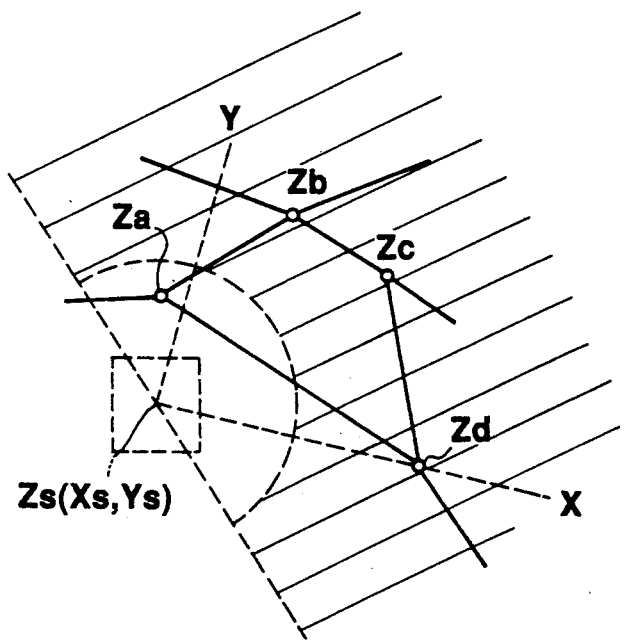
FIG.9
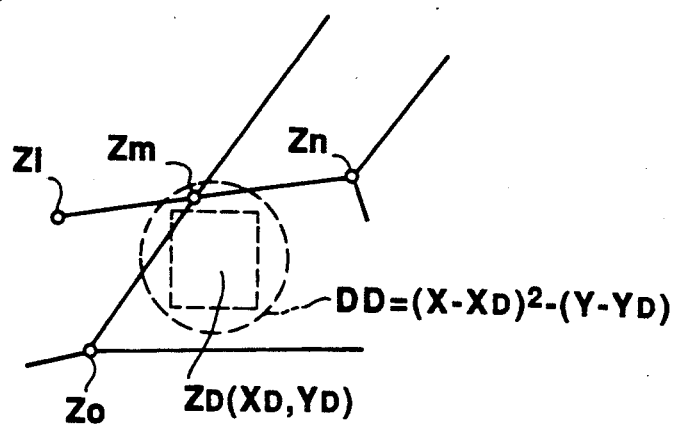
FIG.10
$DD = (X-X_D)^2 - (Y-Y_D)$

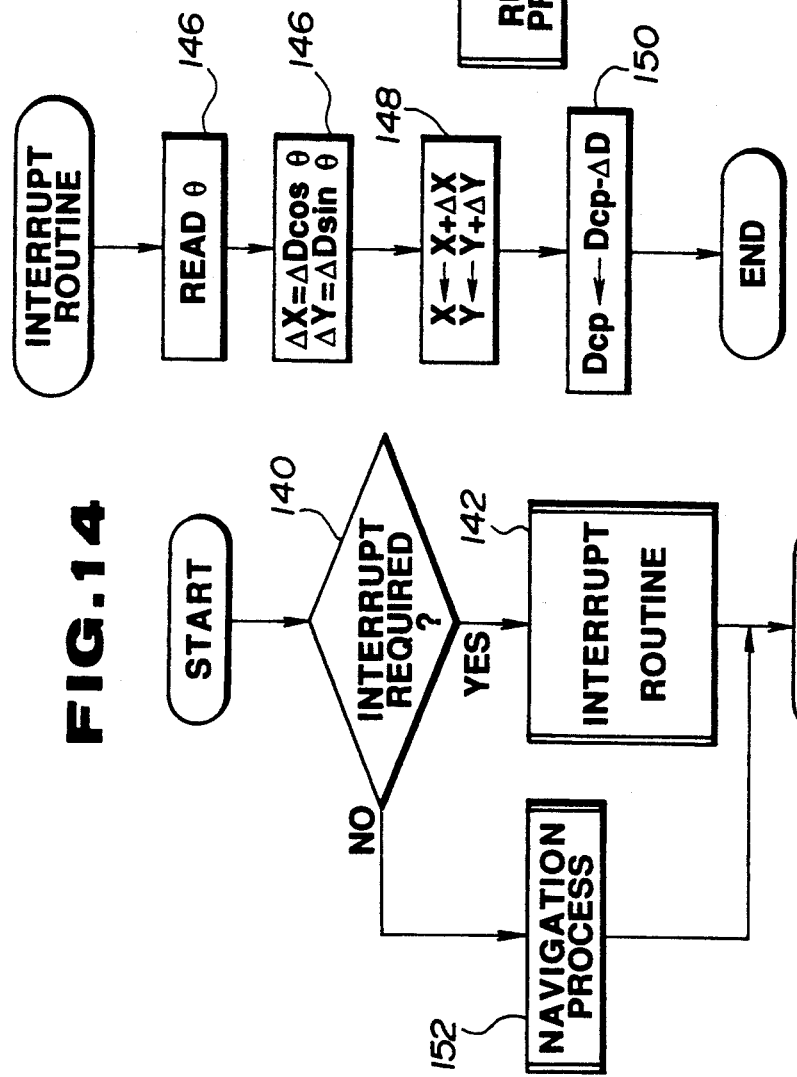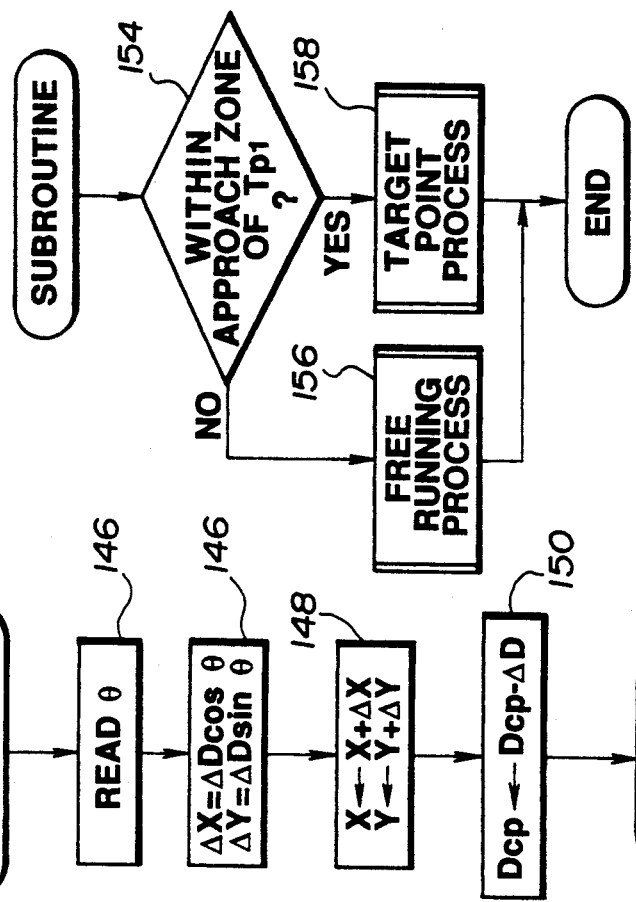

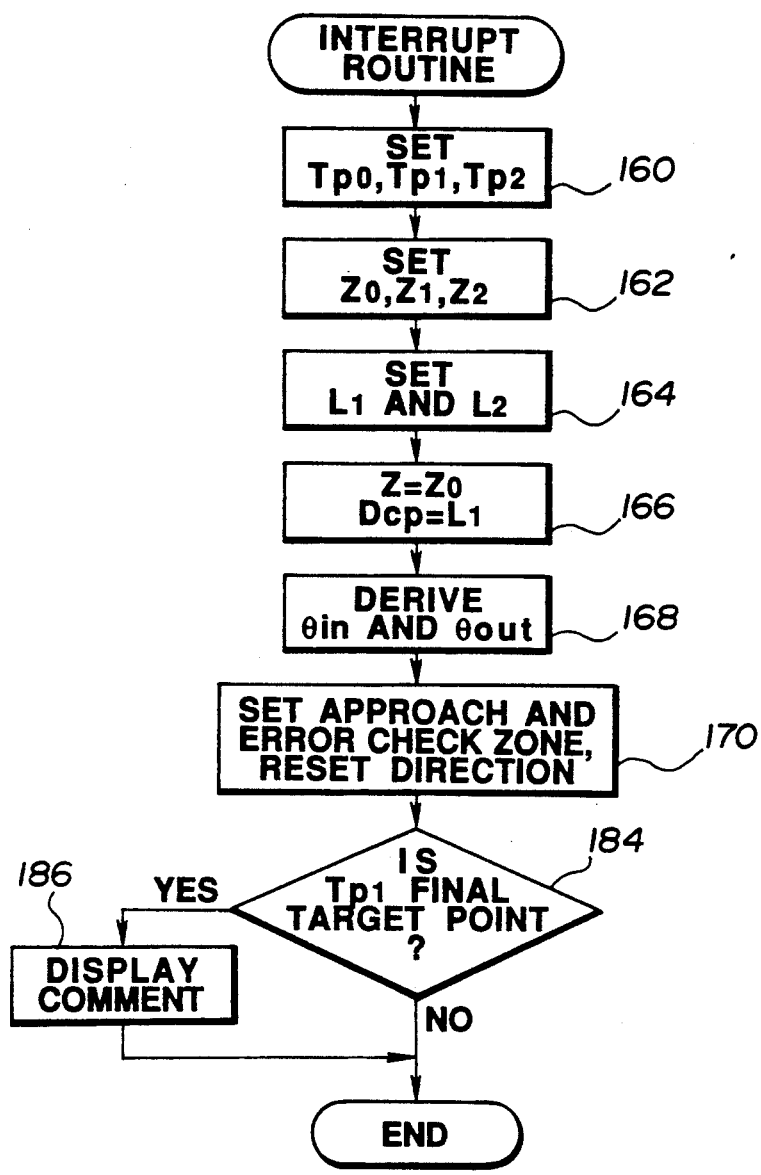
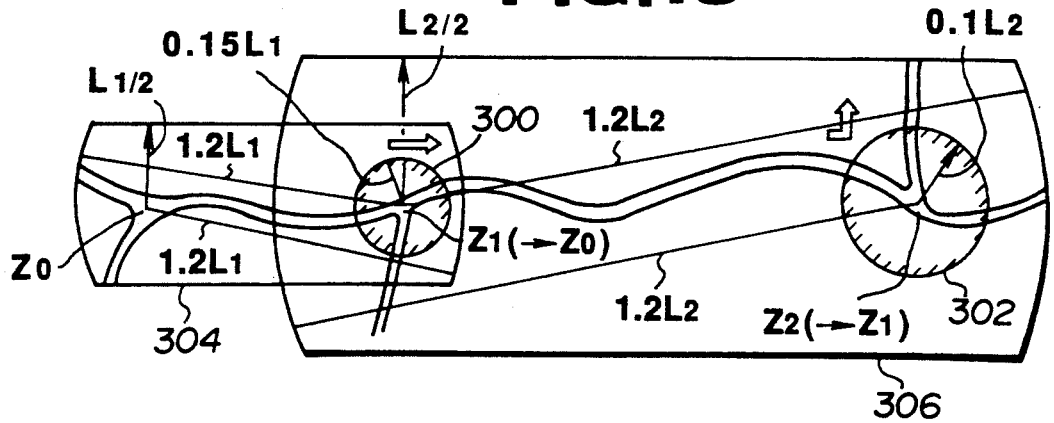

NAVIGATION SYSTEM FOR AUTOMOTIVE VEHICLE

This application is a continuation of application Ser. No. 07/610,246 filed Nov. 9, 1990 now abandoned.

BACKGROUND OF THE INVENTION

1. Field of the Invention

The present invention relates generally to a navigation system for an automotive vehicle. More specifically, the the present invention relates to an automotive navigation system which provides an improved navigation information on a display screen along a preset travel route of the vehicle, to ensure an improved guidance to a destination.

2. Description of the Background Art

One of previously proposed systems for navigating a vehicle is exemplified by Japanese First Patent Publication No. 62-93617.

In this publication, as shown in FIGS. 1(a) and 1(b), when the vehicle enters a predetermined distance range from one of known intersections along a preset route to a given destination, a display unit 1 shows lane and direction designation marks $M_1$, $M_2$ and $M_3$ (FIG. 1(a)), or a direction designation mark $M_4$ (FIG. 1(b)), so that a vehicle driver can choose a proper lane before reaching the intersection.

However, in the above-noted background art, since only the lane and direction designation mark or the direction designation mark is displayed on the display screen in the vicinity of the intersection, the vehicle driver is forced to determine how to drive the vehicle solely based on those information without any other information about the forthcoming intersection, which is burdensome to the vehicle driver, particularly taking into consideration that the intersection itself is sometimes burdensome to the vehicle driver.

SUMMARY OF THE INVENTION

Accordingly, it is an object of the present invention to provide a navigation system for an automotive vehicle that can eliminate the above-noted defects inherent in the background art.

It is another object of the present invention to provide a navigation system for an automotive vehicle, wherein a travel information for a next target point is displayed on a display screen along with an abstract configuration of the next target point.

To accomplish the above-mentioned and other objects, according to one aspect of the present invention, a navigation system for an automotive vehicle comprises:

first means for storing first known target points and adjoining target points preselected for each of said first target points, the adjoining target points preselected from the first target points second means for storing a first data group associated with each of the first target points, each of the first data groups including a second data group corresponding to each of the adjoining target points of the corresponding first target point, each of the second data groups including an abstract configuration of the corresponding first target point and a travel guidance information required at the corresponding first target point for going to the corresponding adjoining target point third means for selecting second target points from the first target points to define a travel route of the vehicle extending through the second target points fourth means for storing the second target points in series fifth means for setting third and fourth target points selected from the stored second target points, the third target point being a next forward target point for the vehicle along the travel route and the fourth target point being one of the adjoining target points of the third target point and being positioned forward of the third target point along the travel route sixth means for monitoring a position of the vehicle seventh means for monitoring a positional relationship between the monitored position of the vehicle and the third target point eighth means, responsive to the monitored positional relationship, for selecting one of the second data groups based on the third target point using as the target point and the fourth target point using as the adjoining target point so as to display the corresponding travel guidance information along with the abstract configuration of the third target point before the vehicle reaches the third target point.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 7 shows an display example of an index for selecting a vehicle starting point and a destination;

FIG. 8 is a flowchart showing a process for deriving an initial target point, a final target point and a route to be travelled by the vehicle;

FIG. 9 is a diagram for explaining how to derive the initial target point;

FIG. 10 is a diagram for explaining how to derive the final target point;

FIG. 14 is a flowchart of a main routine for navigating the vehicle from the initial target point to the final target point;

FIG. 15 is a flowchart of an interrupt routine for deriving a coordinate position of the vehicle and a distance between the position of the vehicle and a next target point;

FIG. 16 is a flowchart of a subroutine for executing a target point navigation process and a free running navigation process;

FIG. 17 is a flowchart of an interrupt routine for deriving an approach check zone, error check zone and a reset direction for a next target point;

FIG. 18 is a diagram for explaining an approach check zone, an error check zone and a reset direction;

DESCRIPTION OF THE PREFERRED EMBODIMENT

Figure 1A:
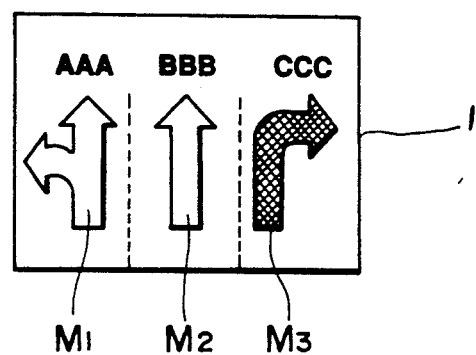
FIGS. 1 (a) and (b) respectively show display examples of navigation information on a display screen according to the background art.
Figure 1B:
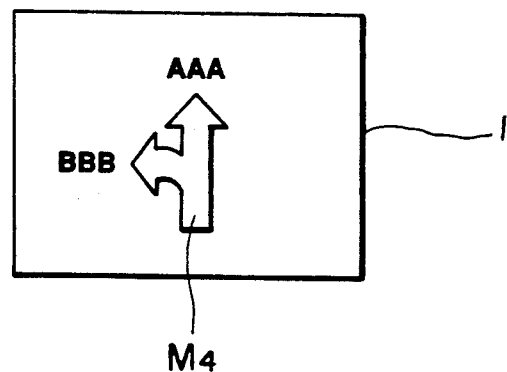

Referring now to the drawings, first to third preferred embodiments of a navigation system for an automotive vehicle according to the present invention will be described with reference to FIGS. 2 to 30.

Figure 2:
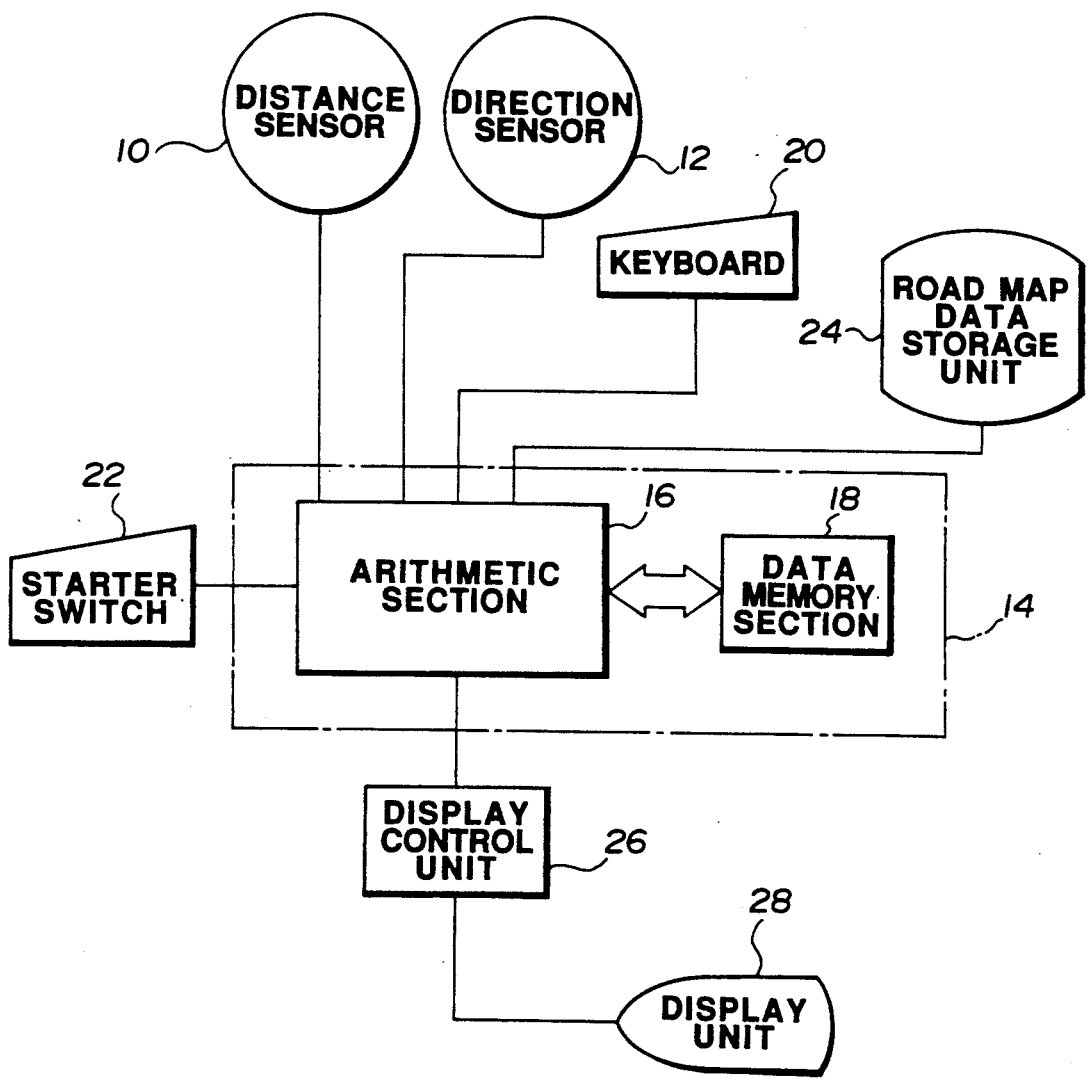
FIG. 2 is a circuit block diagram of a navigation system according to first to third preferred embodiments of the present invention.

FIG. 2 is a circuit block diagram of the navigation system which is used in the first to third preferred embodiments. In FIG. 2, the navigation system includes a distance sensor 10 which outputs a pulse signal per unit distance travelled by the vehicle, and a direction sensor 12, such as, a geomagnetic direction sensor, which outputs a signal indicative of a traveling direction of the vehicle based on the geomagnetic field around the vehicle.

The system further includes a processing unit 14, a microprocessor in practice, which has an arithmetic section 16 and a processing data memory section 18. The outputs from the distance sensor 10 and the direction sensor 12 are fed to an input side of the arithmetic section 16 for sequentially deriving a current position of the vehicle. The processing data memory section 18 stores date on a preset vehicle travel route including known target points therealong, a starting point and a destination, and so forth. The input side of the arithmetic section 16 is further connected to a keyboard 20 for receiving therefrom data, such as, the starting point and the destination based on which the processing unit 14 derives the shortest route to be travelled by the vehicle, which will be described later in detail.

The input side of the arithmetic section 16 is further connected to a starter switch 22 and to a road map data storage unit 24. The starter switch 22 is manually operated when the vehicle reaches an initial target point, which will be described later in detail. The road map data storage unit 24 stores a large volume of the road map data so that it is preferable to utilize an external memory with a large storage capacity. An output side of the arithmetic section 16 is connected to a display control unit 26 for controlling a display on a display screen of a display unit 28, such as, a CRT display.

The display unit 28 displays a navigation information, such as, a direction and a lane, or a lane to be selected by the vehicle at a next target point when the vehicle approaches to enter a given distance range from the next target point. The target point includes an intersection, a branch point and a lane change point on the preset route. The display unit 28 may be arranged in the vicinity of a driver's seat, but a direct display on a vehicular windshield glass using, such as, a head-up display (HUD) may be more preferable.

FIGS. 3(a) to 3(d) show an example of the structure of the road map data stored in the road map data storage unit 24 in FIG. 2. As shown in FIG. 3(a), storage area of the road map data storage unit 24 includes a large number of memory blocks each representing a large map area. A memory block 30 in FIG. 3(a) is one of the memory blocks representing the above-noted large map area. As shown in FIGS. 3(a) and (b), the memory block 30 is divided into a plurality of memory blocks, such as, nine memory blocks 30-1 to 30-9, each of which represents a smaller map area and is further divided into a plurality of target point areas 1, 2, 3, 4, 5 --- 15, 16 --- as shown in FIG. 3(c). Each of the target point areas includes data concerning a target point identified by an identification code of the corresponding target point area (hereinafter, referred to as 'target point code') and adjoining target points around the target point identified by the target point code.

Specifically, as shown in FIG. 3(d), each target point area includes first to sixth memory sections 31 to 36. The first memory section 31 stores data concerning the target point identified by the target point code, including a type of the target point, X and Y coordinates of the target point and a name of the target point.

The type of the target point includes a first type where the target point is an intersection or a branch point between general roads and is assigned '0', a second type where the target point is an intersection between an express-highway and an incoming road and is assigned '1', a third type where the target point is an intersection between an express-highway and an outgoing road and is assigned '2', and a fourth type where the target point is an intersection or a branch point on the express-highway and is assigned '3', and a fifth type where the target point is a lane change point and is assigned '4'.

The second memory section 32 is divided into a plurality of memory sections each storing data concerning an adjoining target point which is positioned neighboring the target point stored in the first section 31. Each adjoining target point is identified by an identification code of the corresponding memory section (hereinafter, referred to as 'adjoining target point code'). Each memory section includes a target point code of the adjoining target point, a code of a road connecting the target point stored in the first section 31 and the adjoining target point, an extending direction of the connecting road at the target point stored in the first section 31, and a distance between the target point and the adjoining target point.

As appreciated from the above description, every target point on the road map is stored in the first section 31 as shown in FIG. 3(d) and has its own adjoining target point preselected from the stored target points. Accordingly, every target point on the road map can be identified by the target point code or the adjoining target point code.

The third section 33 stores guide sign data corresponding to each of the adjoining target point. The guide sign data is stored in the form of letter code as indicated by a reference numeral 52 in FIG. 4 and is similar to an actual guide sign on the actual road at the intersection or the branch point. For example, if the adjoining target point is identified by the adjoining target point code 32-2 in FIG. 3(d) and a guide sign at the target point in the first section 31 for that direction is 'AAA, BBB', then 'AAA, BBB' is stored in the corresponding memory section 33-2 in the third section 33 in letter code.

The fourth section 34 stores data about a configuration of the target point stored in the first section 31, a travel direction to be selected at the target point, and a lane to be selected at the target point. Specifically, the fourth section 34 stores the above-noted data corresponding to each of the adjoining target points. The data for each adjoining target point includes an abstract or simplified configuration of the target point, a travel direction to be selected at the target point for going to the corresponding adjoining target point, and a lane to be selected at the target point for going to the corresponding adjoining target point. Accordingly, the travel direction and the lane to be selected at the target point are displayed on the display screen with the abstract configuration of the target point as shown in FIG. 4.

It is to be appreciated that the above-noted data for each adjoining target point includes the abstract configuration of the target point, the travel direction and the lane to be selected (hereinafter referred to as 'CDL') in case of the target point being an intersection or a branch point, while, the data includes the abstract configuration of the target point and the lane to be selected (hereinafter referred to as 'CL') in case of the target point being a lane change point.

Figure 4:
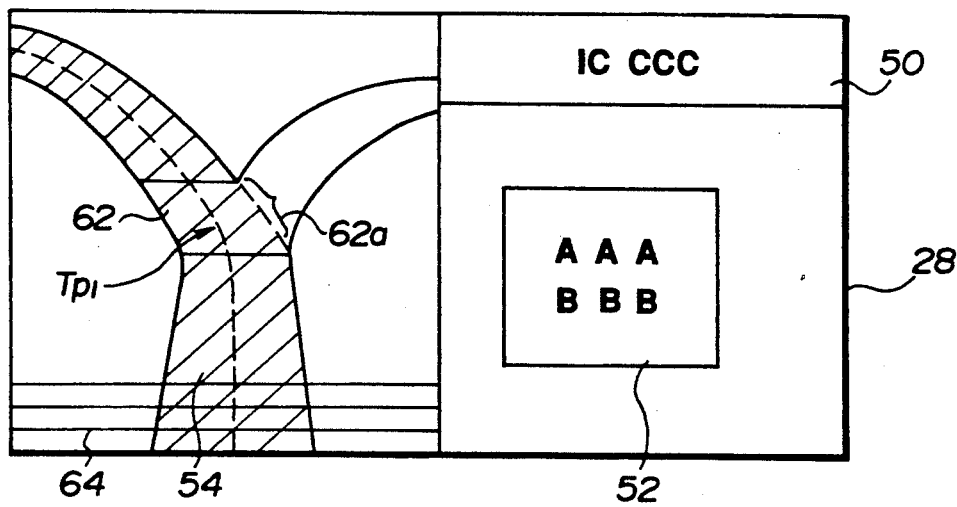
FIG. 4 shows a display example of navigation information according to the first preferred embodiment.

FIG. 4 shows a display example for an interchange on the express-highway. The name of the target point 50 is displayed on the display screen of the display unit 28 at the upper-right, the guide sign 52 at the lower-right, and the CDL information 54 at the left. According to the CDL information 54, a vehicle driver easily understands at first glance that this target point has a Y-shaped configuration and that the travel direction to be selected is the left and either of two lanes can be selected for going to the left as indicated by hatching.

Figure 5:
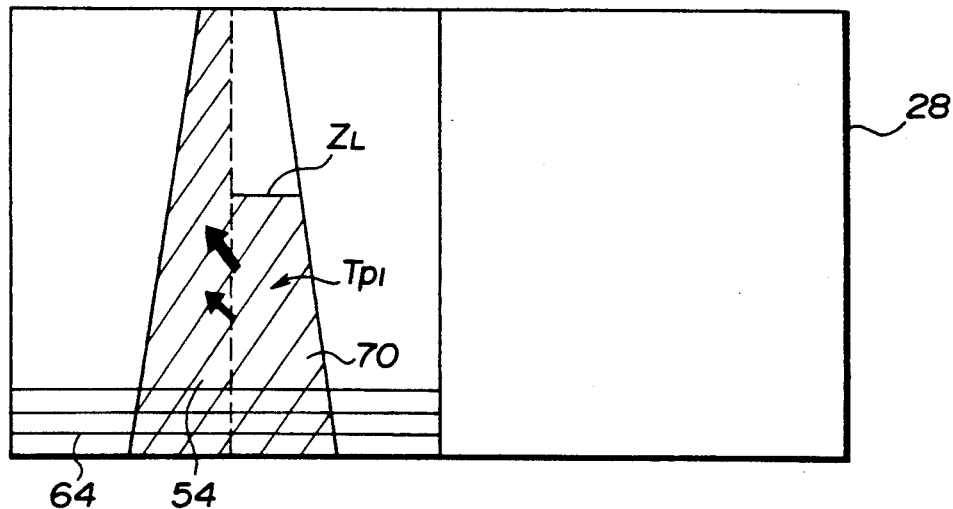
FIG. 5 shows another display example of navigation information according to the first preferred embodiment.

FIG. 5 shows a display example for the lane change point, wherein the CL information 54 is displayed on the left of the display screen. The CL information 54 shows that the target point is the lane change point and that a left lane should be selected for going to a next target point as indicated by hatching. The CL information 54 further indicates that the lane change should be finished before a line $Z_L$.

Figure 6:
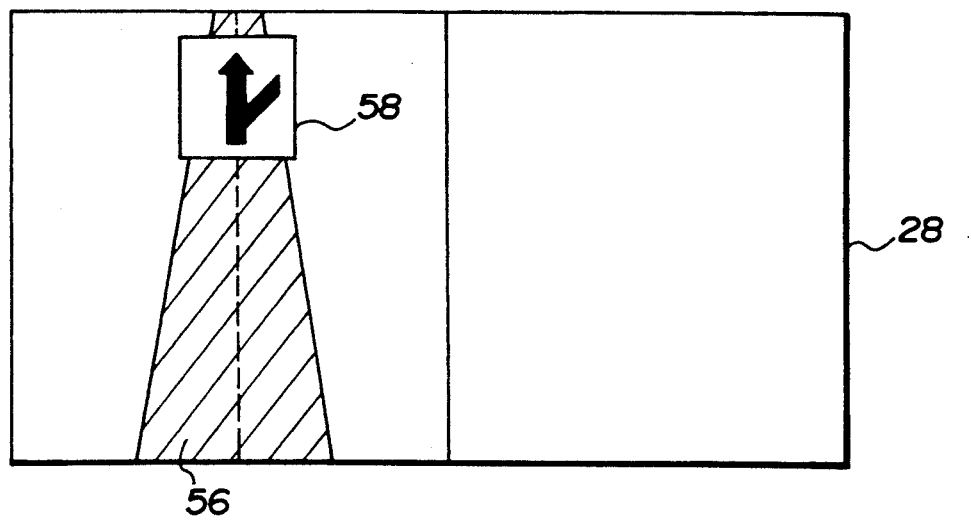
FIG. 6 shows still another display example of navigation information according to the first preferred embodiment.

The fifth section 35 stores data concerning an abstract configuration of the road with selectable lane or lanes between the target point and the adjoining target point, corresponding to each adjoining target point. The data stored in the fifth section 35 is displayed on the display screen when a distance to a next target point, i.e. a corresponding adjoining target point is long, as shown in FIG. 6. The data stored in the fifth section 35 will be referred to as 'free running information' hereinafter. In FIG. 6, the free running information 56 is displayed on the left of the display screen.

The sixth section 36 includes data concerning a further simplified abstract information (hereinafter referred to as 'FS information') corresponding to each of the CDL or CL information stored in the fourth section 34. In FIG. 6, this FS information 58 is shown at the upper of the display screen along with the free running information 56.

The storage area of the road map data storage unit 24 further includes an index of the large map areas one of which is designated by the reference numeral 30 in FIG. 3(a), along with the corresponding small map areas.

Now, the operation of the navigation system according to the first preferred embodiment will be described hereinbelow.

When a power is applied to the system, the system enters a stand-by state for awaiting entry of data. The entry of the data is manually performed by the keyboard 20 designating a starting point of the vehicle and a destination. The system allows the entry of the staring point and the destination in either of two modes. In one mode, the starting point and the destination are input using respective precise coordinate positions, while, in the other mode, the starting point and the destination are input using unit areas to which the starting point and the destination belong, respectively. When using the unit areas for the data entry, the index of the large map areas and the corresponding small map areas as described above is displayed on the display screen as shown in FIG. 7. The index includes names and codes of the large map areas and names and codes of the small map areas each corresponding to the unit area. The entry of the data is performed by inputting the codes of the unit areas for the starting point and the destination using the keyboard 20.

When the system recognizes the entry of the above-noted data, an initial target point, a final target point and a route to be travelled by the vehicle are automatically derived through a process identified by a flowchart of FIG. 8.

At a first step 100, the initial target point is determined. FIG. 9 is for explaining the determination of the initial target point. In FIG. 9, a coordinate position Zs (Xs, Ys) denotes the starting point of the vehicle. The coordinate position Zs is defined by the manually input coordinate position in the above-noted precise mode and by a center of the input unit area in the above-noted other mode. Generally, a stored target point Za nearest the starting point Zs is selected as the initial target point from among stored target points Za, Zb, Zc and Zd around the starting point Zs.

It is preferable, however, to select the initial target point which is away from the starting point more than a predetermined distance, particularly when the starting point is designated by the unit area. This is because, when the starting point is identified by the unit area, the navigation to the initial target point from the starting point Zs may become incorrect or wrong in cases the initial target point is close to the starting point Zs, particularly, when the navigation therebetween is performed by a below-described arrow indication on the display screen.

In this case, the initial target point is selected among the target points Za, Zb, Zc and Zd, which positions closest to the starting point Zs among the target points satisfying following equations (1) and (2).

$$Y(Y_D - Y_S) < X(X_D - X_S) \quad (1)$$

$$(X - X_S)^2 + (Y - Y_S)^2 \leq 3000^2 \quad (2)$$

wherein, $X_D$ and $Y_D$ denote X and Y coordinates, respectively, of a coordinate position $Z_D$ of the input destination, and a value 3000 is used in case of the unit area being 1 Km$^2$ and thus may adjusted to another value depending of size of the unit area.

Accordingly, in FIG. 9, the target point positioned in the hatched area and closest to the starting point Zs is selected as the initial target point, i.e. the target point included in the area having a predetermined radius from the starting point Zs is excluded from the selection of the initial target point.

Subsequently, at a step 102, the final target point is determined. FIG. 10 is for explaining the determination of the final target point. In FIG. 10, the final target point is selected among stored target points Zl, Zm, Zn and Zo, which positions closest to the destination $Z_D$ ($X_D$, $Y_D$). Accordingly, the target point Zm is selected as the final target point.

In practice, the stored target point which makes a value D the least in a following equation (3) is selected as the final target point.

$$D^2 = (X - X_D)^2 + (Y - Y_D)^2 \quad (3)$$

It is to be appreciated that a stored target point which is an intersection between the express-highway and the outgoing road, or an intersection or a branch point on the express-highway, or the lane change point, is excluded from the selection of the initial target point and that a stored target point which is an intersection between the express-highway and the incoming road, or an intersection or a branch point on the express-highway, or the lane change point, is excluded from the selection of the final target point. The above-noted exclusion is executed by checking the type of the target point stored in the first section 31 shown in FIG. 3(d).

Now, the routine proceeds to a step 104 where a route which is the shortest from the starting point Zs to the destination Zd is derived for the vehicle to travel.

Figure 11:
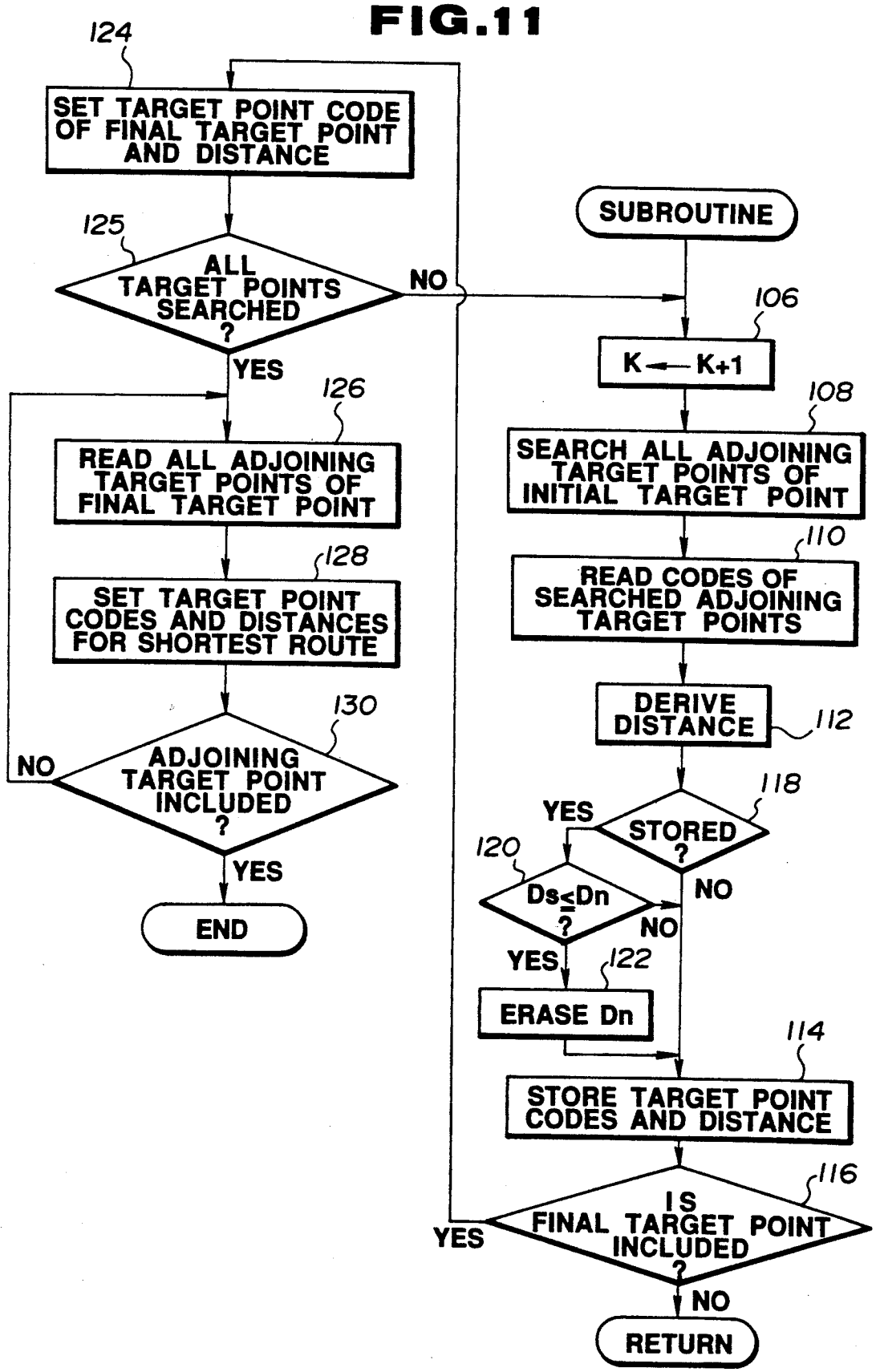
FIG. 11 is a flowchart of a subroutine for deriving a route to be travelled by the vehicle.

FIG. 11 is a flowchart showing a subroutine of the step 104 to be executed by the processing unit 14 for deriving the shortest route.

At a first step 106, a value K initialized to '0' is increased by '1' every time this step is executed. Subsequently, at a step 108, all adjoining target points of the initial target point are searched using a target point code of the initial target point, as first order target points. At a subsequent step 110, target point codes and adjoining target point codes of the searched adjoining target points are read out, and then at a step 112, a distance between the initial target point and each adjoining target point is read out from the second section 32 of the map data shown in FIG. 3(d). At a subsequent step 118, it is checked whether there is any target point code which is already stored at a step 114, which will be described later. If answer at the step 118 is NO, i.e. there is no target point code which is already stored at the step 114, then the routine goes to the step 114 where the target point code and the corresponding read-out distance are stored as a pair for each of the first order target points. At a subsequent step 116, it is checked whether the final target point is included in the first order target points. If answer at the step 116 is NO, i.e. no final target point is included, then the routine returns to the step 106 to increase the value K by '1'. Subsequently, at the step 108, all adjoining target points for each of the first order target points are searched using the target point code of each first order target point, as second order target points. Target point codes and adjoining target point codes of all the second order target points are read out at the step 110, and then at the step 112, a distance between each second order target point and the initial target point is derived. In cases answer at the step 118 is NO, then the routine goes to the steps 114 and 116 as described above and repeats the steps 106 to 116 until answer at the step 116 becomes YES.

On the other hand, if answer at the step 118 is YES, then the routine goes to a step 120 where the distance Ds stored at the step 114 paired with the target point code is compared with the distance Dn newly derived at the step 112. Specifically, for example, in cases a target point A is stored at the step 114 as the first order target point with the distance read-out at the step 112, and the target point A is again searched out in a subsequent execution of the routine and the distance is derived at the step 112, the step 120 compares the distance stored at the step 114 with the distance newly derived at the step 112 to determine which value is larger. If answer at the step 120 is YES, i.e. the stored distance Ds is no more than the newly derived distance Dn, then the routine goes to a step 122 where the newly derived distance Dn is erased so that the stored distance Ds remains effective. On the other hand, if answer at the step 120 is NO, then the distance Dn is stored paired with the corresponding target point code and the stored distance Ds is erased.

By repeating the process as described above, all target points leading to the initial target point are searched out in sequence.

As appreciated, since the step 120 functions to erase a longer distance for a duplicate target point as described above, each target point stored at the step 114 is paired with the shortest distance from the initial target point.

Figure 12:
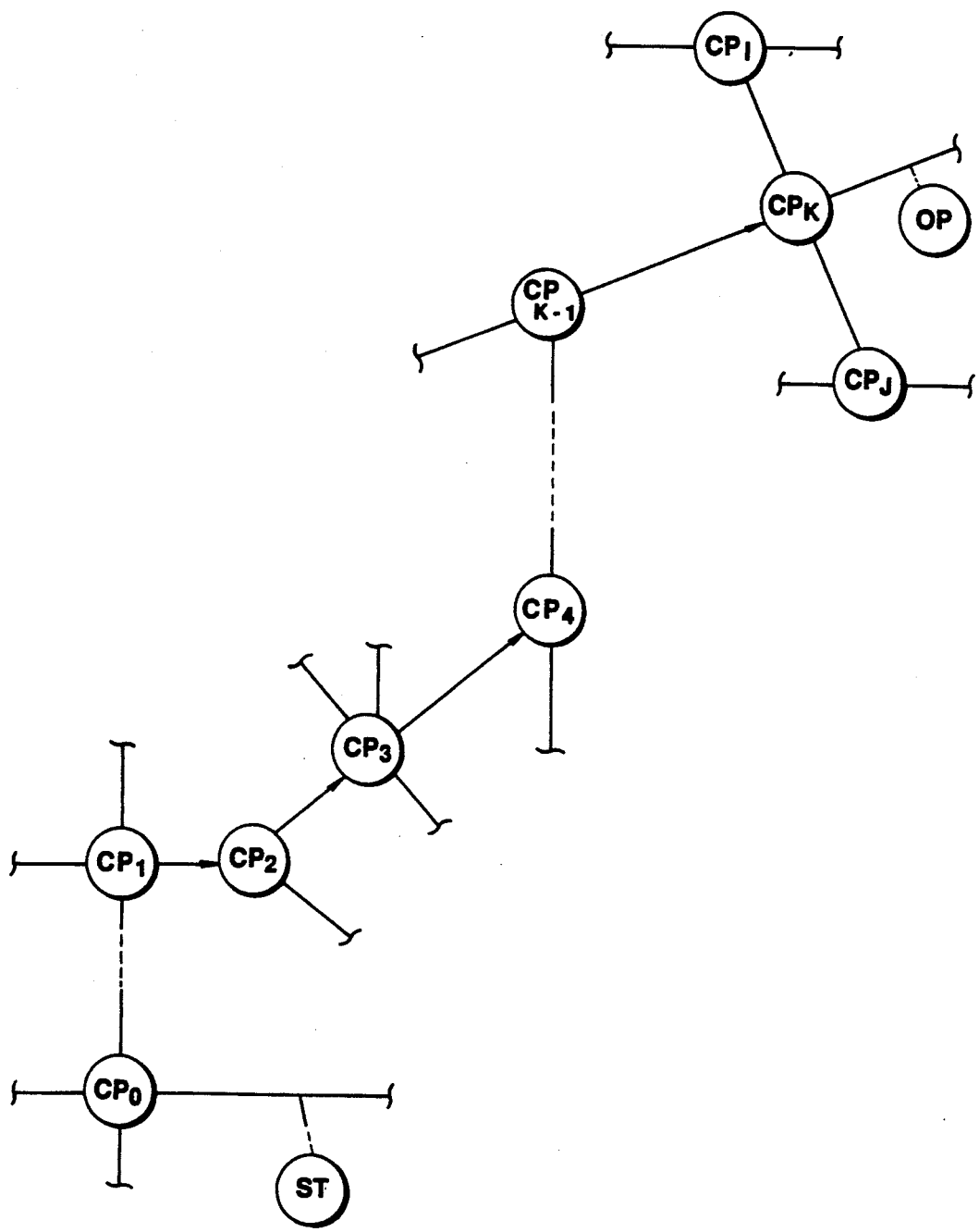
FIG. 12 is a diagram for explaining how to derive the shortest travel route.

If answer at the step 116 is YES, i.e. the final target point is found in the stored target points, then the routine goes to a step 124 where the target point code of the final target point is set paired with the distance between the initial target point and the final target point. Subsequently, at a step 125, it is checked whether all the possible target points are searched out, for example, by checking whether all the adjoining target points of the final target point are stored at the step 114. If answer at the step 125 is NO, then the routine returns to the step 106 to increase the value K by '1' so as to search higher order target points until all the adjoining target points of the final target point are stored at the step 114. On the other hand, if answer at the step 125 is YES, then the routine goes to steps 126 to 130 where the target points which provides the shortest travel route between the initial target point and the final target point, i.e. between the starting point Zs and the destination Zd are selected and set. FIG. 12 is for explaining this process. In FIG. 12, when all the adjoining target points $CP_I$, $CP_J$ and $CP_{K-1}$ of the final target point $CP_K$ are read out at the step 126 by searching the map data of FIG. 3(d) using the target point code of the final target point $CP_K$, the step 128 selects one of the adjoining target points $CP_{K-1}$ which provides the shortest distance between the final target point $CP_K$ and the initial target point $CP_0$ and set the stored target point code of $CP_{K-1}$ paired with the stored distance. Subsequently, the step 130 checks whether $CP_{K-1}$ is one of the adjoining target points of the initial target point $CP_0$. If answer at the step 130 is YES, then the routine of FIG. 11 ends. On the other hand, if answer at the step 130 is NO, then the routine returns to the step 126 where all the adjoining target points of $CP_{K-1}$ are read out by searching the map data using the target point code of $CP_{K-1}$. Subsequently, the step 128 selects one of the adjoining target points $CP_4$ which provides the shortest distance between $CP_{K-1}$ and $CP_0$, and sets the stored target point code of $CP_4$ paired with the stored distance. Subsequently, the step 130 checks whether $CP_4$ is one of the adjoining target points of $CP_0$. In this way, the steps 126 to 130 are repeated to select $CP_3$, $CP_2$ and $CP_1$ in sequence until answer at the step 130 becomes YES, i.e. until one of the adjoining target points $CP_1$ is selected and set at the step 128.

If answer at the step 130 becomes YES, the subroutine of FIG. 11 ends and the main routine of FIG. 8 also ends.

As appreciated, through the routines of FIGS. 8 and 11, the initial and final target points and the shortest route along with the included target points to be travelled by the vehicle are automatically derived and set.

Figure 13:
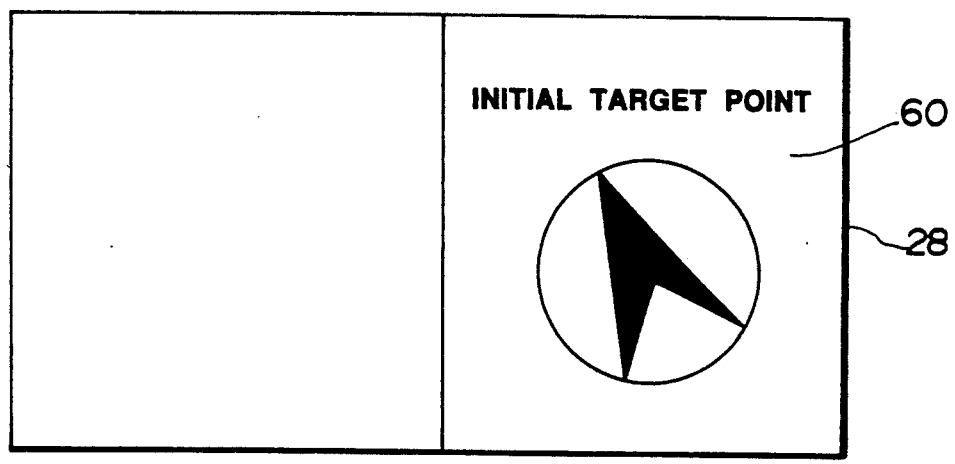
FIG. 13 shows a display example for navigating the vehicle from the starting point to the initial target point.

After the shortest travel route is set, a directional indication 60, such as, shown in FIG. 13 is displayed on the display screen for guiding the vehicle to the initial starting point. This directional indication is also displayed on the display screen when the vehicle travels from the final target point to the destination. When the vehicle reaches the initial target point guided by the directional indication 60, the starter switch 22 is manually operated to turn on so as to start the navigation of the vehicle from the initial target point to the final target point.

FIG. 14 shows a flowchart of a main routine for navigating the vehicle.

At a first step 140, it is checked whether a pulse signal indicative of a unit distance $\Delta D$ travelled by the vehicle is input from the distance sensor 10. If answer at the step 140 is YES, then an interrupt routine of FIG. 15 is executed at a step 142.

As appreciated, the interrupt routine is executed per unit distance $\Delta D$ travelled by the vehicle. At a first step 144, a traveling direction $\theta$ of the vehicle is read out from an output of the direction sensor 12. Subsequently, at a step 146, a distance $\Delta X$ and a distance $\Delta Y$ are respectively derived using following equations:

$$\Delta X = \Delta D \times \cos\theta$$

$$\Delta Y = \Delta D \times \sin\theta$$

wherein, $\Delta X$ and $\Delta Y$ are distances travelled by the vehicle along X-axis and Y-axis, respectively, on the X—Y coordinate plane, per unit distance $\Delta D$ travelled by the vehicle in a direction $\theta$.

Subsequently, at a step 148, $\Delta X$ and $\Delta Y$ are added to distances X and Y, respectively, which are accumulated distances travelled by the vehicle along X-axis and Y-axis, respectively, so as to derive corrent accumulated distances X and Y which define a current coordinate position Z (X, Y) of the vehicle.

Further, at a step 150, a distance $D_{CP}$ between a current position of the vehicle and a next target point is updated by subtracting the unit distance $\Delta D$ every time this interrupt routine is executed, so as to sequentially monitor the distance $D_{CP}$ between the vehicle and the next target point. The distance $D_{CP}$ is initialized to a distance $L_1$ at a step 166 in FIG. 17, which will be described later.

On the other hand, if answer at the first step 140 is NO, i.e. no interrupt is required, then a step 152 executes the navigation process, which will be described later.

FIG. 17 shows a flowchart of an interrupt routine which is triggered by a positive answer issued from a step 194 in FIG. 19, which will also be described later.

It is assumed that the vehicle is traveling along a preset travel route at a position backward of a target point $T_{P0}$ and that a target point $T_{P1}$ is positioned next to $T_{P0}$ with respect to a traveling direction of the vehicle along the preset route, and that a target point $T_{P2}$ is positioned next to $T_{P1}$ with respect to the vehicle traveling direction along the preset route. Throughout the specification, a positional relationship among $T_{P0}$, $T_{P1}$ and $T_{P2}$ is the same as noted above.

Figure 19:
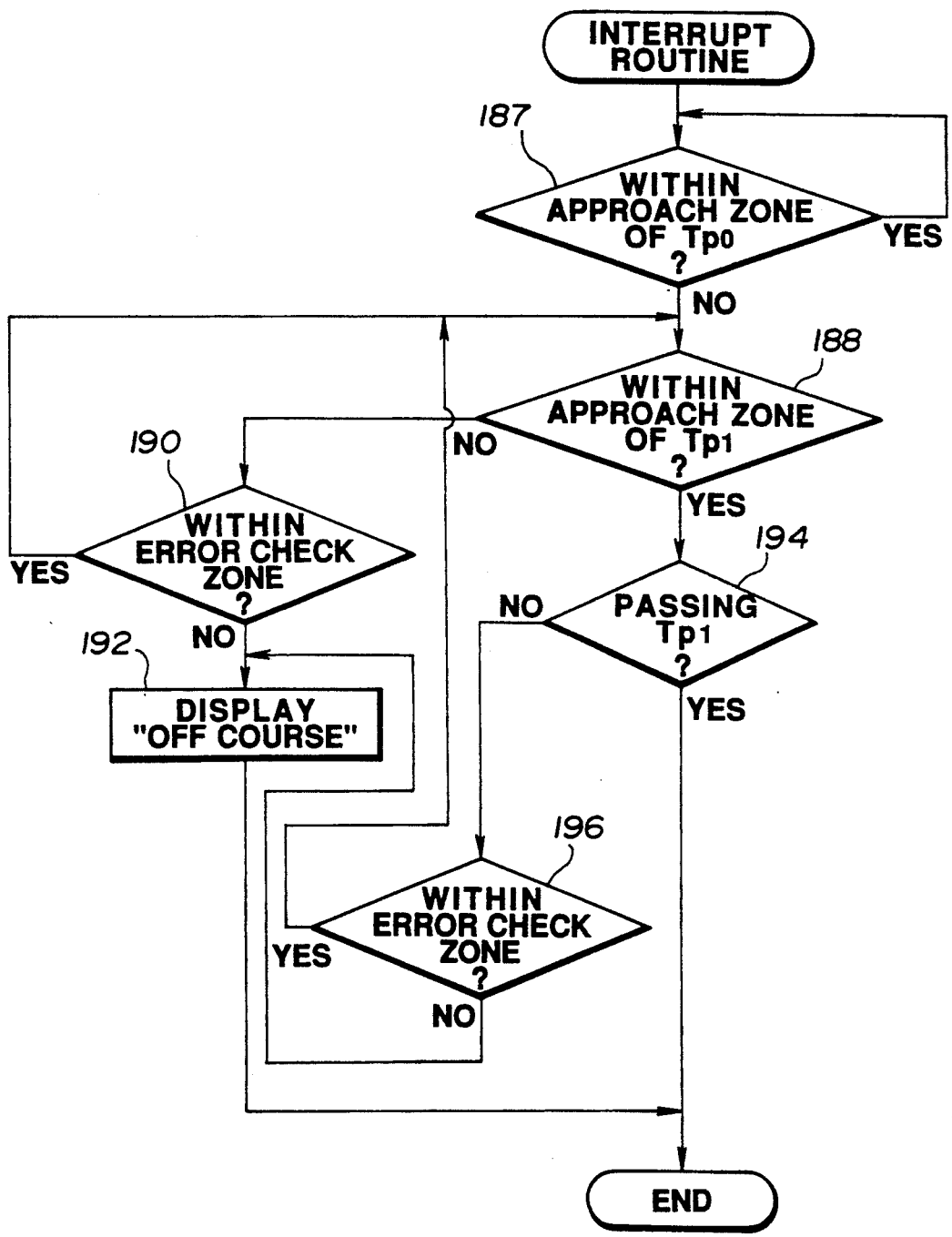
FIG. 19 is a flowchart of an interrupt routine for detecting whether the vehicle is off the preset route using the approach check zone and the error check zone.

When the positive answer at the step 194 in FIG. 19 is issued, which means, when the vehicle reached or passes $T_{P0}$, then target point codes of $T_{P0}$, $T_{P1}$ and $T_{P2}$ are read out from the data memory section 18 which stores the preset travel route with the selected target points therealong, and set at a first step 160. Subsequently, coordinate positions $Z_0$, $Z_1$ and $Z_2$ of $T_{P0}$, $T_{P1}$ and $T_{P2}$ are respectively read out from the first section 31 of the map data shown in FIG. 3(d) and set at a step 162. At a subsequent step 164, a distance $L_1$ between $T_{P0}$ and $T_{P1}$ and a distance $L_2$ between $T_{P1}$ and $T_{P2}$ are respectively read out from the second section 32 of the map data of FIG. 3(d) and set. Then, at a step 166, a current coordinate position Z derived at the step 148 in FIG. 15 is set to $Z_0$ of $T_{P0}$, and a distance $D_{CP}$ derived at the step 150 in FIG. 15 is set to the distance $L_1$ between $T_{P0}$ and $T_{P1}$.

Subsequently, at a step 168, an entry direction $\theta$in and an exit direction $\theta$out of travel of the vehicle through the target point $T_{P1}$ are respectively derived based on the data concerning the road extending direction stored in the second section 32 of the map data of FIG. 3(d), using the target point codes of $T_{P0}$, $T_{P1}$ and $T_{P2}$ set at the step 160. Then, at a step 170, an approach check zone, an error check zone and a reset direction are set, which will be described hereinbelow with reference to FIG. 18.

In FIG. 18, it is assumed that the vehicle passes $T_{P1}$ straight, i.e. the preset route set at the step 104 in FIG. 8 extends straight through $T_{P1}$ and that the vehicle turns to the left at $T_{P2}$, i.e. the preset route requires a turn or change in a vehicle travel direction at $T_{P2}$. When the vehicle reached or passes $T_{P0}$, an approach check zone 300 and an error check zone 304 are set at the step 170.

Similarly, when the vehicle reached or passes $T_{P1}$, an approach check zone 302, an error check zone 306 and a reset direction are set at the step 170.

It is to be appreciated that when the vehicle reached or passes $T_{P1}$, the step 194 in FIG. 19 issues a positive answer to execute the interrupt routine of FIG. 17. Accordingly, at the step 160, $T_{P1}$ is set to $T_{P0}$, $T_{P2}$ is set to $T_{P1}$ and a further forward target point next to $T_{P2}$ is set to $T_{P2}$, and similarly, at the step 162, $Z_1$ is set to $Z_0$, $Z_2$ is set to $Z_1$ and a coordinate position of the further forward target point is set to $Z_2$.

The approach check zone 300 is a circle in shape centered on $Z_1$ of $T_{P1}$ and having a radius of $0.15L_1$, and the approach check zone 302 is a circle in shape centered on $Z_2$ of $T_{P2}$ and having a radius of $0.1L_2$. Each of the radii has a lower limit of, for example, 500 m.

The error check zone 304 or 306 is in the form of a rectangle with a center longitudinal axis extending through $Z_0$ ($T_{P0}$) and $Z_1$ ($T_{P1}$) or $Z_1$ ($T_{P1}$) and $Z_2$ ($T_{P2}$), respectively, and with a width of $0.5L_1$ or $0.5L_2$, respectively. Accordingly, the error check zone 304 or 306 covers a width of $0.25L_1$ or $0.25L_2$ for either side of the corresponding center longitudinal axis. Further, longitudinal ends of the error check zone 304 or 306 are defined by circular arcs of radii each of $1.2L_1$ or $1.2L_2$ centered on $Z_0$ and $Z_1$ or $Z_1$ and $Z_2$, respectively. It is to be noted that the error check zone 304 or 306 is not derived at the step 170 when a target point $T_P$ is a lane change point.

The reset direction is selected at a value between $\theta_{in}$ and $\theta_{out}$ through the target point $T_{P2}$, i.e. within a turning angle of the vehicle at $T_{P2}$. It is to be noted that the reset direction is not derived at the step 170 when the target point $T_P$ is the lane change point since all the lane change points are considered to be straight.

Subsequently, a step 184 checks whether $T_{P1}$ is the final target point. If answer at the step 184 is NO, the interrupt routine ends. On the other hand, if answer at the step 184 is YES, the routine goes to a step 186 which displays a comment that $T_{P1}$ is the final target point.

FIG. 19 shows a flowchart of an interrupt routine executed, for example, per unit time for detecting whether the vehicle is off the preset route, using the approach check zone and the error check zone.

It is assumed that the step 194 has determined in a prior cycle of the interrupt routine execution that the vehicle reached or passes the target point $T_{P0}$. As described before, the interrupt routine of FIG. 17 is triggered by this determination to execute the foregoing steps.

At a first step 187, it is checked whether the vehicle is within an approach check zone of $T_{P0}$ (not shown), i.e. whether the vehicle has passed through the approach check zone of $T_{P0}$, using the current position of the vehicle derived at the step 148 of FIG. 15. If answer at the step 187 is YES, i.e. the vehicle is within the approach check zone of $T_{P0}$, then the routine repeats the step 187 until the vehicle gets out of the approach check zone $T_{P0}$. If answer at the step 187 is NO, then the routine goes to a step 188 where it is checked whether the vehicle is within the approach check zone 300. If answer at the step 188 is NO, then the routine goes to a step 190 which checks whether the vehicle is within the error check zone 304. If answer at the step 190 is NO, then the routine goes to a step 192 where an indication, such as, 'OFF COURSE' is displayed on the display screen and this interrupt routine ends. On the other hand, if answer at the step 190 is YES, then the routine returns to the step 188. It is to be noted that a step 154 of a subroutine shown in FIG. 16 issues a negative answer to execute a step 156 where a free running process is performed when answer at the step 187 or 190 is YES, which will be described later.

On the other hand, if answer at the step 188 is YES, i.e. the vehicle is within the approach check zone 300, then the routine goes to the step 194 which checks whether the vehicle reached or passes the target point $T_{P1}$. It is to be noted that, in this preferred embodiment, the step 194 determines that the vehicle reached or passes the target point $T_P$ when the distance $D_{CP}$ derived at the step 150 in FIG. 15 becomes zero in case of the preset travel route through the target point $T_p$ being straight, and when the vehicle turns to a direction within a predetermined range with respect to the reset direction which is set at the step 170 in FIG. 17.

If answer at the step 194 is YES, i.e. the vehicle reached or passes $T_{P1}$, then the routine ends. As described above, if answer at the step 194 is YES, the interrupt routine of FIG. 17 is triggered to be executed so that, for example, at the step 160, $T_{P1}$ is set to $T_{P0}$, $T_{P2}$ is set to $T_{P1}$ and a target point $T_P$ next to $T_{P2}$ is set to $T_{P2}$, and the step 162 is executed accordingly. On the other hand, if answer at the step 194 is NO, then the routine goes to a step 196 which checks whether the vehicle is within the error check zone 304. If answer at the step 196 is NO, then the routine goes to the step 192 which displays the indication 'OFF COURSE' and the routine ends. On the other hand, if answer at the step 196 is YES, then the routine returns to the step 188. It is to be noted that the step 154 of the subroutine shown in FIG. 16 issues a positive answer to execute a step 158 where a target point process is performed when answer at the step 196 is YES, which will be described later.

FIG. 16 shows a flowchart of the subroutine of the step 152 in FIG. 14 for executing the navigation process. It is assumed that the vehicle travels between the target points $T_{P0}$ and $T_{P1}$. At the first step 154, it is checked whether the vehicle is within the approach check zone 300 of $T_{P1}$. In practice, as described above, the first step 154 checks whether answer at the step 187 or 190 is YES or answer at the step 196 is YES. If answer at the step 154 is NO, i.e. answer at the step 187 or 190 is YES, then the routine goes to the step 156 where the free running process is executed. In the free running process, the free running information stored in the fifth section 35 in FIG. 3(d) and as shown by the reference numeral 56 in FIG. 6 is displayed on the display screen. As described before, it is preferable to display the further simplified information 58 in addition to the free running information 56.

Figure 20:
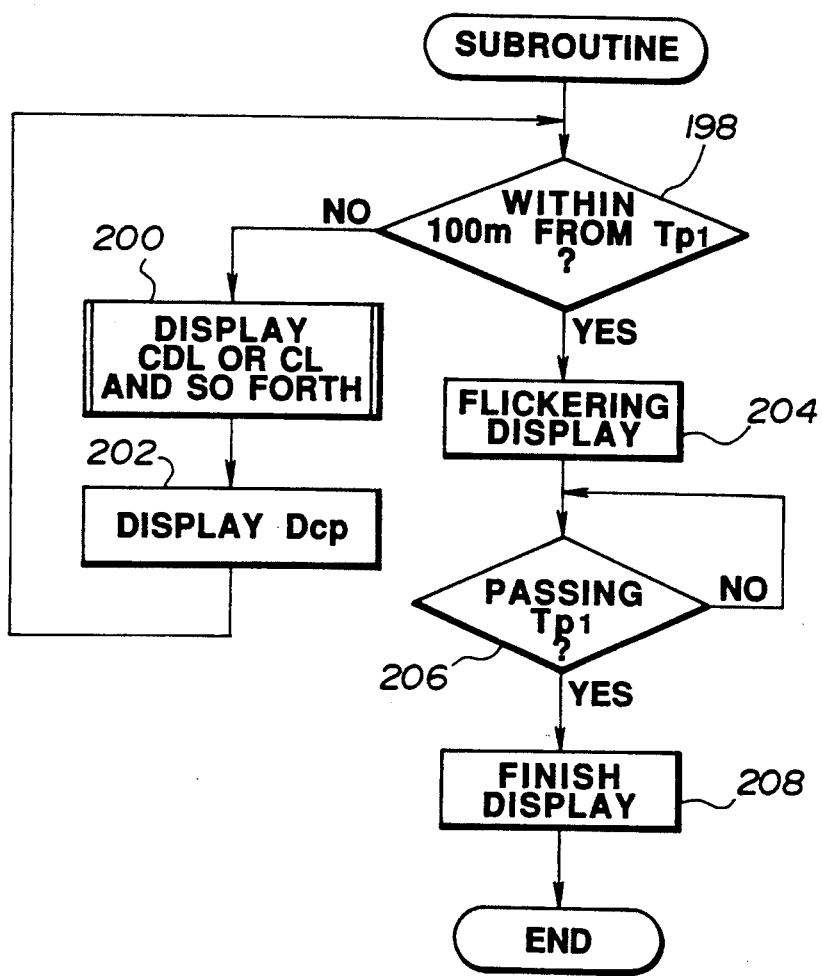
FIG. 20 is a flowchart of a subroutine for executing the target point navigation process.

On the other hand, if answer at the step 154 is YES, i.e. answer at the step 196 is YES, then the routine goes to the step 158 where the target point process is executed. FIG. 20 shows a subroutine of the step 158.

At a first step 198, it is checked whether the vehicle is within 100 m from the target point $T_{P1}$. This check is performed based on the distance $D_{CP}$ derived at the step 150 in FIG. 15. If answer at the step 198 is NO, then the routine goes to a step 200 where the CDL or CL information is displayed on the display screen. The CDL or CL information is as shown in FIG. 4 in case the target point $T_{P1}$ is the intersection or the branch point, and as shown in FIG. 5 in case $T_{P1}$ is the lane change point. Subsequently, at a step 202, the distance $D_{CP}$ derived at the step 150 in FIG. 15 is also displayed as a segment display 64 in FIGS. 4 and 5.

On the other hand, if answer at the step 198 is YES, i.e. the vehicle is within 100 m from $T_{P1}$, the routine goes to a step 204 where the CDL or CL information and the distance $D_{CP}$ as described at the steps 200 and 202 are displayed with the hatched portions shown in FIG. 4 or 5 being flickering. Subsequently, at a step 206, it is checked whether the vehicle reached or passes the target point $T_{P1}$ based on answer at the step 194 in FIG. 19. If answer at the step 206 is NO, then the routine repeats the step 206 until answer at the step 206 becomes YES, i.e. the vehicle reached or passes the target point $T_{P1}$. If answer at the step 206 is YES, then the routine goes to a step 208 where the display of the CDL or CL information on the display screen is finished.

Figure 21:
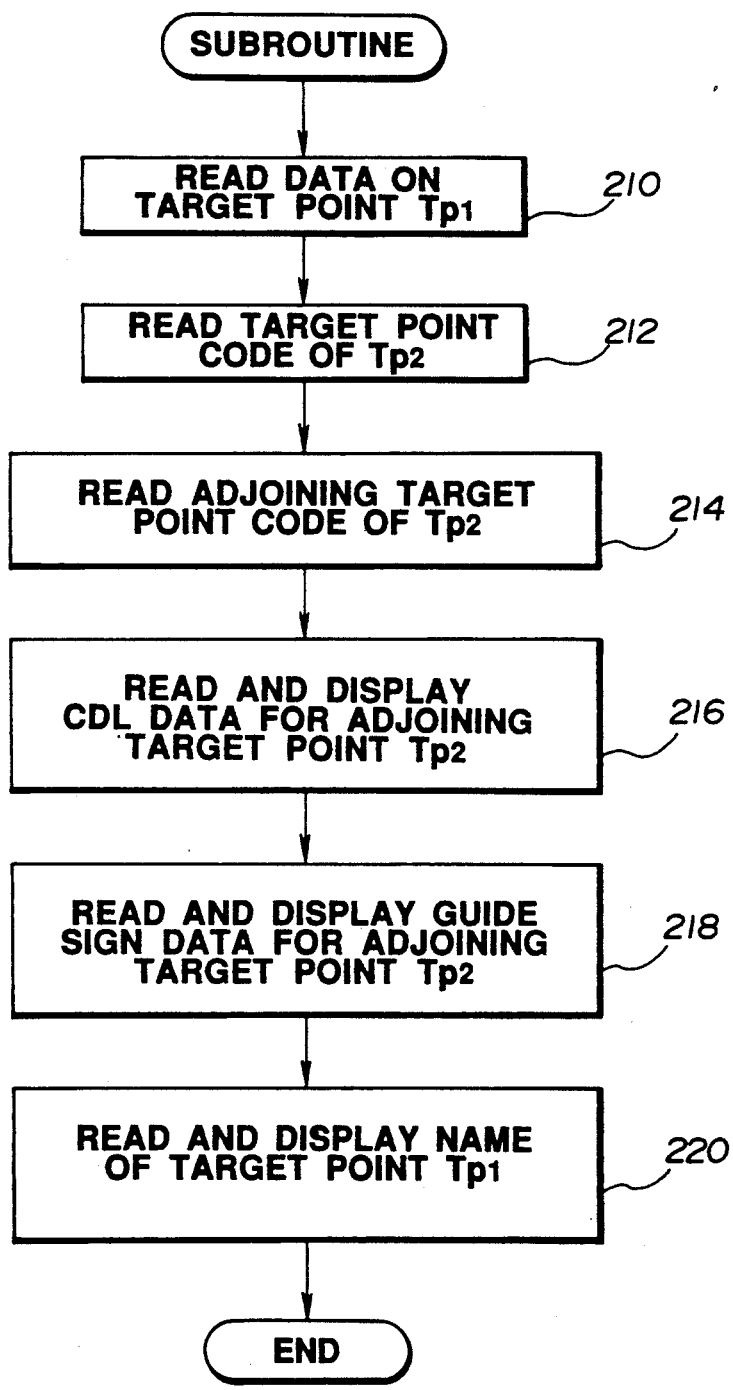
FIG. 21 is a flowchart of a subroutine for executing the target point navigation process in case of a next target point being an intersection or a branch point, according to the first preferred embodiment.
Figure 22:
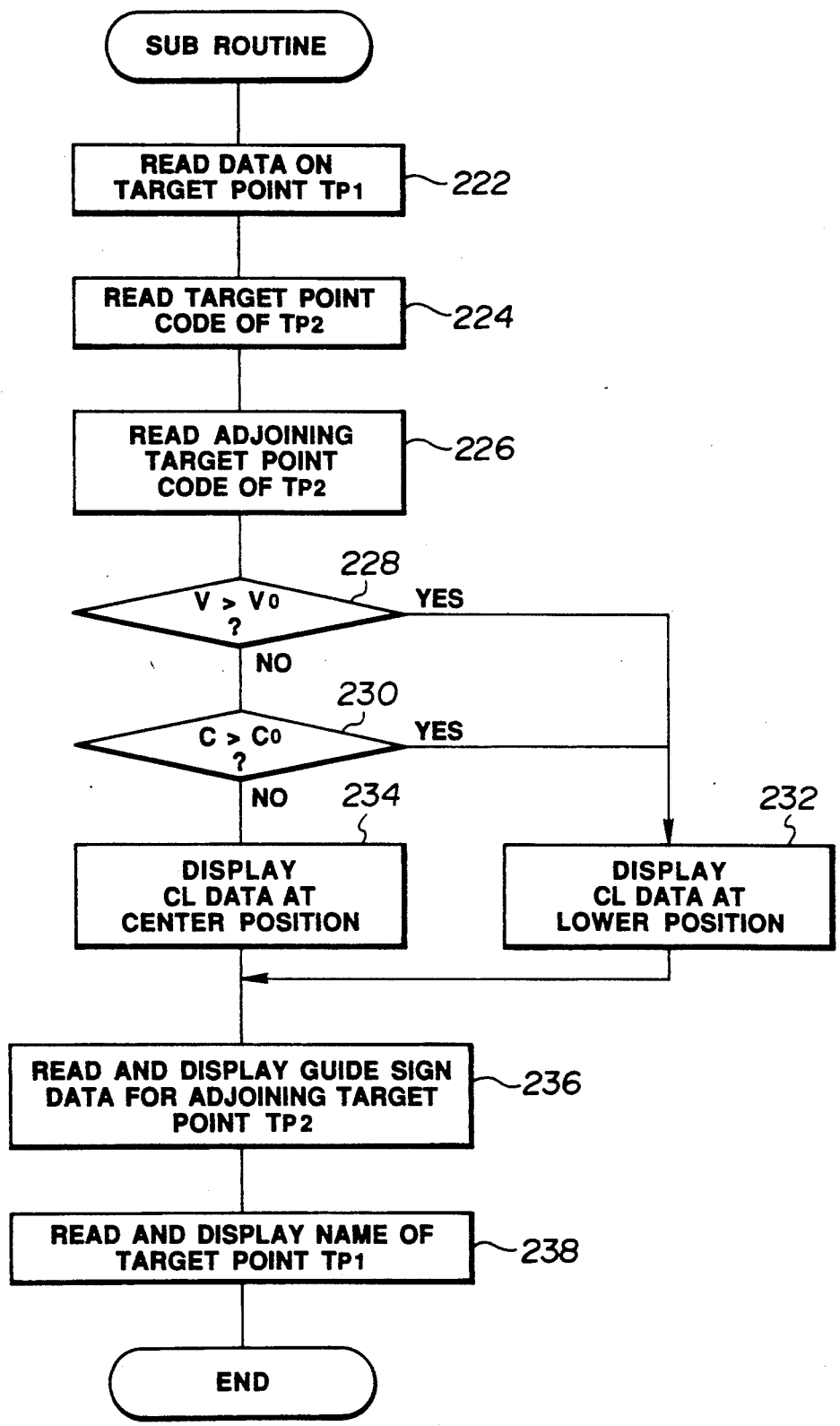
FIG. 22 is a flowchart of a subroutine for executing the target point navigation process in case of a next target point being a lane change point, according to the first preferred embodiment.

FIG. 21 shows a subroutine of the step 200 in FIG. 20 for displaying the CDL information as shown in FIG. 4, i.e. when the target point is the intersection or the branch point. On the other hand, FIG. 22 shows a subroutine of the step 200 in FIG. 20 for displaying the CL information as shown in FIG. 5, i.e. when the target point is the lane change point. Selection of one of the subroutines of FIGS. 21 and 22 is performed by checking the type of the target point stored in the first section 31 shown in FIG. 3(d).

In the subroutine of FIG. 21, at a first step 210, the data on the target point $T_{P1}$ is read out from the map data of FIG. 3(d) using a target point code of $T_{P1}$ set at the step 160 in FIG. 17. At a subsequent step 212, a target point code of $T_{P2}$ is read out from the step 160 in FIG. 17. Subsequently, at a step 214, an adjoining target point code of $T_{P2}$ is read out from the second section 32 of the map data read out at the first step 210 using the target point code of $T_{P2}$ read out at the step 212. At a subsequent step 216, the CDL data for the adjoining target point $T_{P2}$ stored in the fourth section 34, i.e. the data concerning a configuration of $T_{P1}$, a direction and a lane to be selected, is read out from the read-out map data and displayed on the display screen. Subsequently, at a step 218, the data for the adjoining target point $T_{P2}$ stored in the third section 33, i.e., a guide sign for the adjoining target point $T_{P2}$ is read out from the read-out map data and displayed on the display screen. Then, at a step 220, a name of the target point $T_{P1}$ is read out from the first section 31 of the read-out map data and displayed.

In the subroutine of FIG. 22, at a first section 222, the data on the target point $T_{P1}$ is read out from the map data of FIG. 3(d) using a target point code of $T_{P1}$ set at the step 160 in FIG. 17. At a subsequent step 224, a target point code of $T_{P2}$ is read out from the step 160 in FIG. 17. Subsequently, at a step 226, an adjoining target point code of $T_{P2}$ is read out from the second section 32 of the map data read out at the first step 222 using the target point code of $T_{P2}$ read out at the step 224.

Subsequently, at a step 228, a current vehicle speed V is compared with a preset value $V_0$. As appreciated, the current vehicle speed is derived based on the outputs from the distance sensor 10. If answer at the step 228 is YES, i.e. the current speed V is larger than $V_0$, then the routine goes to a step 232 where the CL data for the adjoining target point $T_{P2}$ stored in the fourth section 34 and as shown in FIG. 5 is read out from the read-out map data and displayed on the display screen at its lower position in FIG. 5, i.e. below the vertical center on the display screen. On the other hand, if answer at the step 228 is NO, i.e. the current speed V is no more than $V_0$, then the routine goes to a step 230 where a current traffic volume C is compared with a preset value $C_0$. The current traffic volume C may be derived based on vehicle acceleration data and vehicle deceleration data derived from the outputs of the distance sensor 10, such as, disclosed in a U.S. patent application Ser. No. 07/432,937 filed on Nov. 7, 1989 contents of which are herewith incorporated by reference for the sake of disclosure. If answer at the step 230 is YES, i.e. the current traffic volume C is larger than $C_0$, then the routine goes to the step 232 where the CL data for the adjoining target point $T_{P2}$ is displayed in a manner as described above. On the other hand, if answer at the step 230 NO, then the routine goes to a step 234 where the CL data for the adjoining target point $T_{P2}$ is displayed on the display screen at its vertical center as shown in FIG. 5.

Following the execution of the step 232 or 234, the routine proceeds to a step 236 where the data of the adjoining target point $T_{P2}$ stored in the third section 33, i.e. a guide sign for the adjoining target point $T_{P2}$ is read out from the read-out map data and displayed on the display screen. Then, at a step 238, a name of the target point $T_{P1}$ is read out from the first section 31 of the read-out map data and displayed.

It is to be appreciated that in cases no guide sign data is stored in the third section 33 of the map data for a target point being the lane change point, the step 236 may be omitted. Further, in cases no title is stored in the first section 31 of the map data for a target point being the lane change point, the step 238 may be omitted.

It is further to be appreciated that the display manner executed by the step 232 is required in view of the followings:

As shown in FIG. 5, the line $Z_L$ indicates the final point for the vehicle to change the lane, and accordingly, the hatched portions backward of $Z_L$ with respect to the vehicle traveling direction imply a margin zone for the vehicle to change the lane. Accordingly, in cases the vehicle speed V or the traffic volume C is larger than $V_0$ or $C_0$, respectively, it is preferable to shift a display position of the target point, i.e. the line $Z_L$ downward in FIG. 5 to shorten the displayed margin zone so that the vehicle driver may finish the lane change at an earlier timing. It is to be appreciated that a coordinate position z of a target point $T_P$ stored in the first section 31 of the map data may be a coordinate position of the line $Z_L$ in case of $T_P$ being the lane change point.

Figure 23:
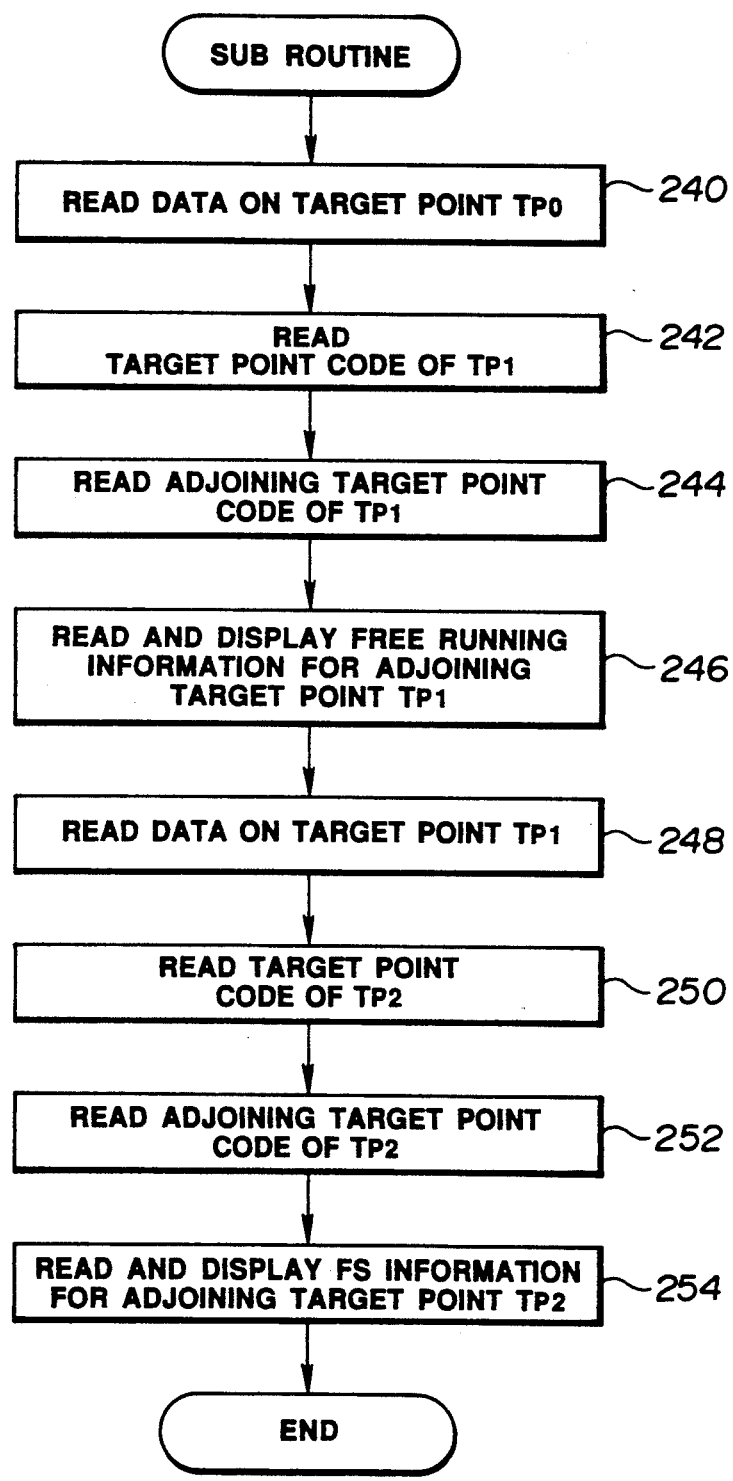
FIG. 23 is a flowchart of a subroutine for executing the free running navigation process according to the first preferred embodiment.

FIG. 23 shows a subroutine of the step 156 in FIG. 16 for executing the free running process as shown in FIG. 6.

It is assumed that the vehicle is traveling between the target points $T_{P0}$ and $T_{P1}$ and that answer at the step 154 in FIG. 16 is NO. At a first step 240, the data on the target point $T_{P0}$ is read out from the map data of FIG. 3(d) using a target point code of $T_{P0}$ set at the step 160 in FIG. 17. At a subsequent step 242, a target point code of $T_{P1}$ is read out from the step 160 in FIG. 17. Subsequently, at a step 244, an adjoining target point code of $T_{P1}$ is read out from the second section 32 of the map data read out at the first step 240 using the target point code of $T_{P1}$ read out at the step 242. At a subsequent step 246, the free running information for the adjoining target point $T_{P1}$ stored in the fifth section 35 of the map data is read out from the map data read out at the first step 240 and displayed as shown by the reference numeral 56 in FIG. 6.

Subsequently, at a step 248, the data on the target point $T_{P1}$ is read out from the map data of FIG. 3(d)

using the target point code of $T_{P1}$ read out at the step 242. At a subsequent step 250, a target point code of $T_{P2}$ is read out from the step 160 in FIG. 17. Subsequently, at a step 252, an adjoining target point code of $T_{P2}$ is read out from the second section 32 of the map data read out at the step 248 using the target point code of $T_{P2}$ read out at the step 250. Then, at a step 254, the FS information for the adjoining target point $T_{P2}$ stored in the sixth section 36 of the map data is read out from the map data read out at the step 248 and displayed as shown by the reference numeral 58 in FIG. 6.

As appreciated from the foregoing description, the first preferred embodiment provides, for example, the following advantages. It is assumed that the vehicle is traveling from the target point $T_{P0}$ to the target point $T_{P1}$.

Until the vehicle reaches the approach check zone 300 of $T_{P1}$, as shown in FIG. 6, the free running information 56 with the FS information 58 which shows a direction to be selected at $T_{P1}$, is displayed on the display screen. Accordingly, the vehicle driver easily recognizes that the free running is being allowed, and further since the vehicle driver gets the information about the direction to be selected at $T_{P1}$ far backward of $T_{P1}$, i.e. the lane to be selected is also appreciated far backward of $T_{P1}$, the smooth and stable vehicle driving is ensured.

On the other hand, after the vehicle enters the approach check zone 300 and until the vehicle reaches $Z_1$ of $T_{P1}$, as shown in FIG. 4 or 5, the CDL or CL information is displayed on the display screen. Since the CDL or CL information includes the abstract or simplified configuration of the target point $T_{P1}$, the vehicle driver easily recognizes at a first glance the direction and lane to be selected at $T_{P1}$ or the lane to be selected at $T_{P1}$.

Further, the display manner of the lane change point, i.e. the display position of the lane change point on the display screen is adjusted according to the vehicle speed and the traffic volume, which ensures the smooth and safe lane change operation.

Now, the second preferred embodiment of the navigation system according to the present invention will be described hereinbelow.

In the second preferred embodiment, the type of the target point stored in the first section 31 of the map data of FIG. 3(d) does not include the foregoing fifth type where the target point is a lane change point. Further, in the second preferred embodiment, the step 160 of the interrupt routine in FIG. 17 sets a target code of $T_{P3}$ in addition to those of $T_{P0}$, $T_{P1}$ and $T_{P2}$. $T_{P3}$ is a target point next to $T_{P2}$ with respect to the vehicle traveling direction along the preset route. As described in the first preferred embodiment, the fourth section 34 of the map data of FIG. 3(d) stores an abstract configuration of the target point with a direction and a lane, or with a lane to be selected at the target point for going to each of the adjoining target points. On the other hand, in the second preferred embodiment, if there is an adjoining target point which is close to the target point, i.e. within a predetermined distance from the target point, the storage area for that close adjoining target point (hereinafter referred to as '$L_{ST}$') is further divided into smaller storage areas (hereinafter referred to as '$S_{ST}$') each storing an abstract configuration of that close adjoining target point with a direction and a lane, or with a lane to be selected at that close adjoining target point for going to one of further adjoining target points which are adjoining target points of that close adjoining target point. The storage area $L_{ST}$ is identified by an adjoining target point code of that close adjoining target point and the storage area $S_{ST}$ is identified by a target code of the corresponding further adjoining target point. For an adjoining target point which is distanced from the target point over the predetermined distance, the storage area for that over-distanced adjoining target point stores the data as in the first preferred embodiment.

Figure 24:
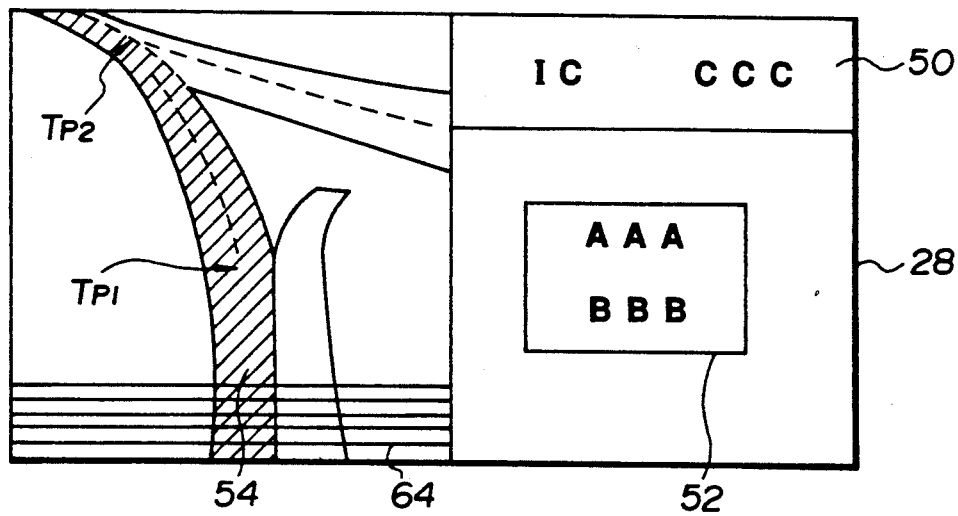
FIG. 24 shows a display example of navigation information according to the second preferred embodiment.
Figure 25:
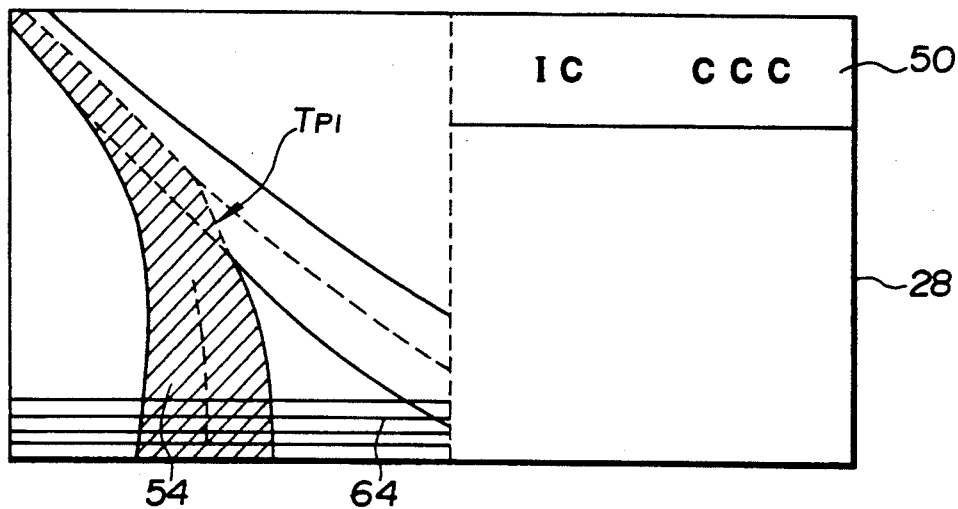
FIG. 25 shows another display example of navigation information according to the second preferred embodiment.
Figure 27:
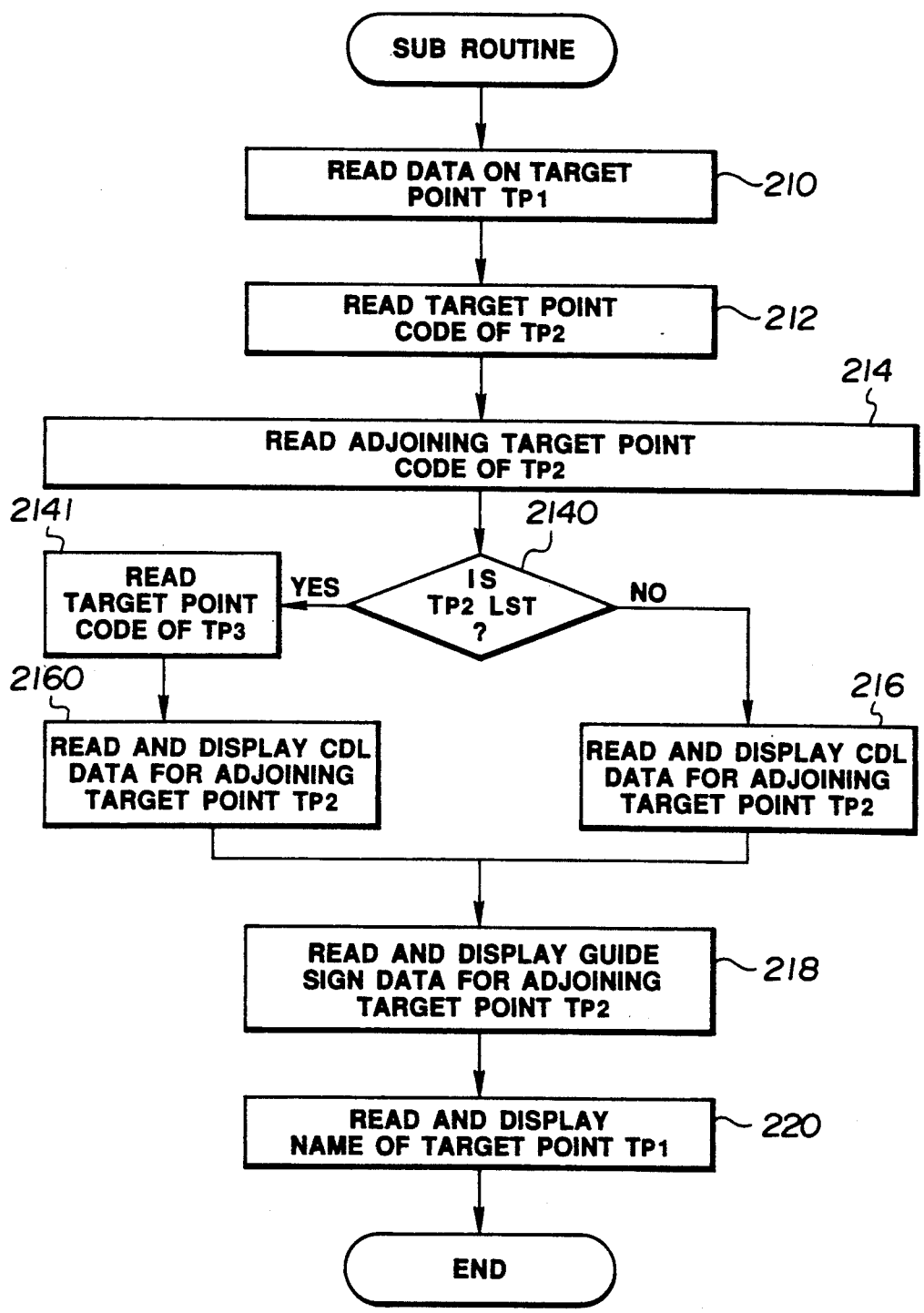
FIG. 27 is a flowchart of a subroutine for executing the target point navigation process according to the second preferred embodiment.

Now, the operation of the second preferred embodiment will be described with reference to FIG. 27 which shows a subroutine of the step 200 in FIG. 20 according to the second preferred embodiment for displaying the CDL or CL information as shown in FIG. 24 or 25.

It is assumed that the vehicle is traveling from $T_{P0}$ to $T_{P1}$. At a first step 210, the data on $T_{P1}$ is read out from the map data of FIG. 3(d) using a target code of $T_{P1}$ set at the step 160 in FIG. 17. At a subsequent step 212, a target point code of $T_{P2}$ is read out from the step 160 in FIG. 17. Subsequently, at a step 214, an adjoining target point code of $T_{P2}$ is read out from the second section 32 of the map data read out at the first step 210 using the target point code of $T_{P2}$ read out at the step 212. At a subsequent step 2140, it is checked whether the adjoining target point $T_{P2}$ includes $S_{ST}$, i.e. whether the adjoining target point is $L_{ST}$ including the smaller storage areas $S_{ST}$. This check at the step 2140 is easily performed, for example, by assigning '0' to $L_{ST}$ and '1' to other adjoining target points having no $S_{ST}$. If answer at the step 2140 is NO, i.e. the adjoining target point $T_{P2}$ is not $L_{ST}$, then the routine goes to a step 216 where the data CDL for the adjoining target point $T_{P2}$ is read out from the read-out map data using the read-out adjoining target point code of $T_{P2}$ and displayed on the display screen, such as, the CDL information 54 as shown in FIG. 25. On the other hand, if answer at the step 2140 is YES, then the routine goes to a step 2141 where a target point code of $T_{P3}$ is read out from the step 160 in FIG. 17. Subsequently, the routine goes to a step 2160 where the data CDL for the adjoining target point $T_{P2}$ is read out from the read-out map data using the adjoining target point code of $T_{P2}$ and the target point code of $T_{P3}$ and displayed on the display screen, such as, the CDL information 54 in FIG. 24.

After the execution of the step 216 or 2160, the routine goes to steps 218 and 220. Since these steps 218 and 220 are the same as the steps 218 and 220 in FIG. 21, explanation thereof is omitted herewith so as to avoide redundant disclosure.

It is to be appreciated that the storage area for the foregoing close adjoining area may store only a configuration of that close adjoining area in addition to a configuration of the target point with a direction and a lane to be selected at the target point for going to that close adjoining target point. In this case, as appreciated, the storage area of that close adjoining area does not include the smaller areas $S_{ST}$. Accordingly, it is not necessary for the step 160 in FIG. 17 to set $T_{P3}$, and the subroutine indicated in FIG. 21 in the first preferred embodiment can be used as it is.

Figure 28:
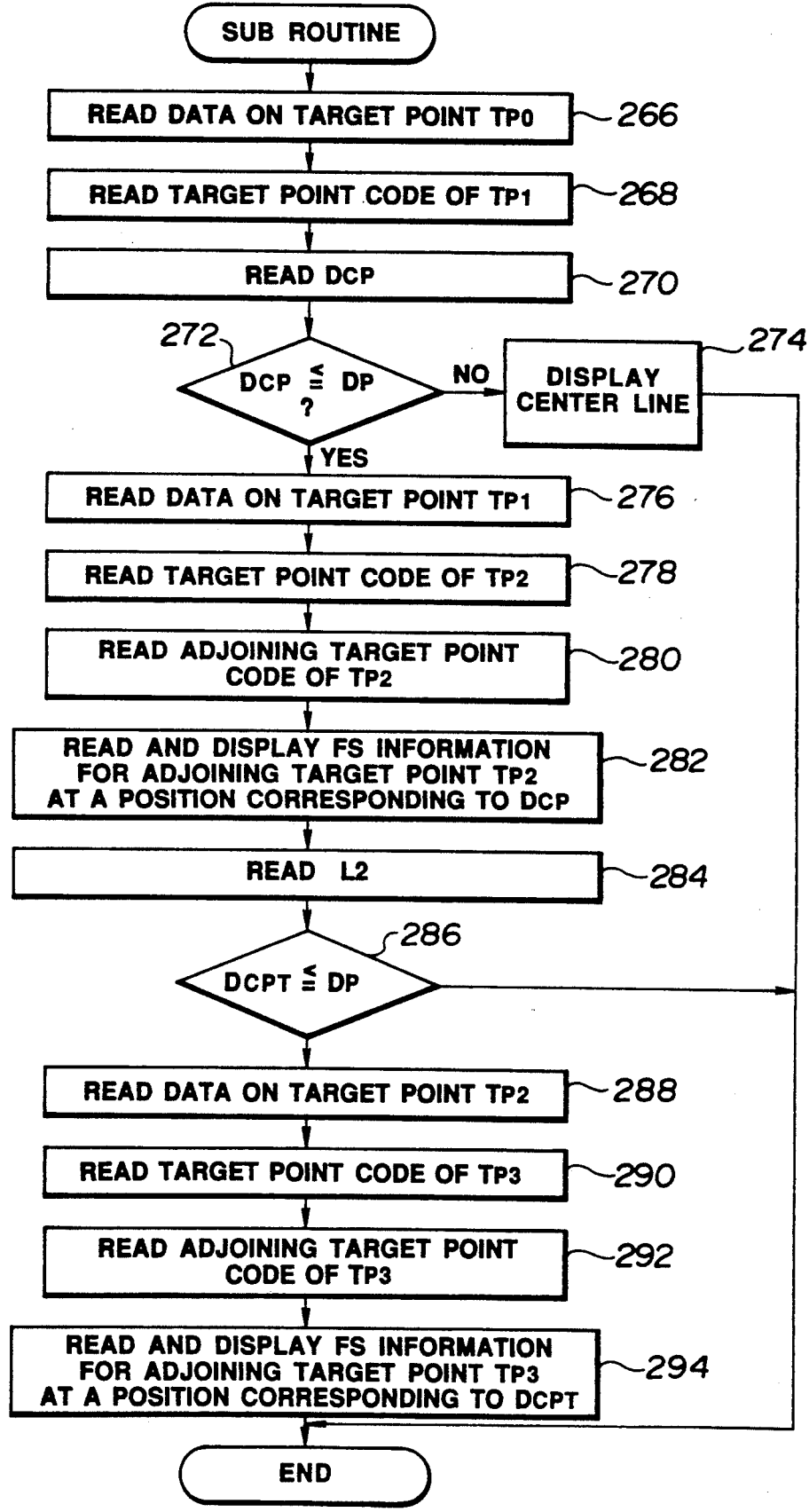
FIG. 28 is a flowchart of a subroutine for executing the free running navigation process according to the second preferred embodiment.

In the second preferred embodiment, a further modification is made to the first preferred embodiment. Specifically, FIG. 28 shows a subroutine of the step 156 in FIG. 16, which differs from the subroutine of FIG. 23 in the first preferred embodiment. The subroutine of FIG. 28 executes the free running process without using the free running information stored in the fifth section 35 of the map data shown in FIG. 3(d).

Figure 26:
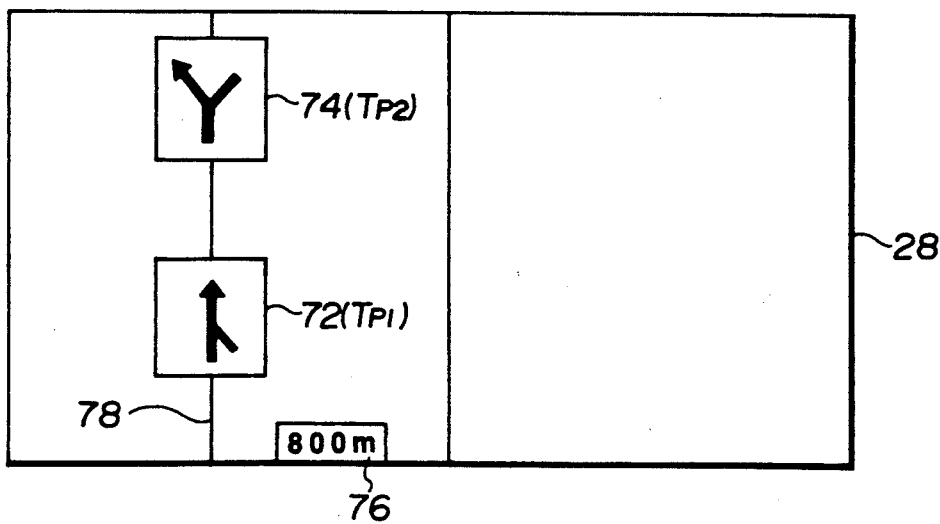
FIG. 26 shows still another display example of navigation information according to the second preferred embodiment.

It is assumed that the vehicle is traveling between the target point $T_{P0}$ to $T_{P1}$ and that answer at the step 154 in FIG. 16 is NO. At a first step 266, the data on the target point $T_{P0}$ is read out from the map data of FIG. 3(d) using a target point code of $T_{P0}$ set at the step 160 in FIG. 17. At a subsequent step 268, a target point code of $T_{P1}$ is read out from the step 160 in FIG. 17. Subsequently, at a step 270, a distance $D_{CP}$ is read out from the step 150 in FIG. 15. At a subsequent step 272, it is checked whether the read-out distance $D_{CP}$ is within a preset display range of the display screen. In practice, the distance $D_{CP}$ is compared with a preset distance $D_P$. If answer at the step 272 is NO, i.e. $D_{CP}$ is larger than $D_P$, then the routine goes to a step 274 where only the center line indicated by a reference numeral 78 in FIG. 26 is displayed on the display screen. Data for the center line is stored, for example, in ROM of the processing unit 14 in FIG. 2. On the other hand, if answer at the step 272 is YES, then the routine goes to a step 276 where the data on the target point $T_{P1}$ is read out from the map data of FIG. 3(d) using the target point code of $T_{P1}$ read out at the step 268. At a subsequent step 278, a target point code of $T_{P2}$ is read out from the step 160 in FIG. 17. Subsequently, a step 280, an adjoining target point code of $T_{P2}$ is read out from the second section 32 of the map data read out at the step 276 using the target point code of $T_{P2}$ read out at the step 278. Then, at a step 282, the FS information for the adjoining target point $T_{P2}$ stored in the sixth section 36 of the map data is read out from the map data read out at the step 276 and displayed on the display screen at a position corresponding to the read-out distance $D_{CP}$, as shown in FIG. 26 by a reference numeral 72.

Subsequently, the routine proceeds to a step 284 where a distance $L_2$ between $T_{P1}$ and $T_{P2}$ is read out from the step 164 in FIG. 17. At a subsequent step 286, it is checked whether a total distance $D_{CPT}(D_{CP}+L_2)$ is no more than the preset distance $D_P$. If answer at the step 286 is NO, i.e. $D_{CPT}$ is more than $D_P$, then the routine ends. On the other hand, if answer at the step 286 is YES, then the routine goes to a step 288 where the data on the target point $T_{P2}$ is read out from the map data of FIG. 3(d) using the target point code of $T_{P2}$ read out at the step 278. Then, at a step 290, a target point code of $T_{P3}$ is read out from the step 160 in FIG. 17. Subsequently, the routine goes to a step 292 where an adjoining target point code of $T_{P3}$ is read out from the second section 32 of the map data read out at the step 288 using the target point code of $T_{P3}$ read out at the step 290. Then, at a step 294, the FS information for the adjoining target point $T_{P3}$ stored in the sixth section 36 of the map data is read out from the map data read out at the step 288 and displayed on the display screen at a position corresponding to the total distance $D_{CPT}$, as shown in FIG. 26 by a reference numeral 74.

If it is desired to display further forward target points on the display screen, for example, $T_{P3}$, $T_{P4}$---, further steps corresponding to the steps 276 to 294 may be executed after the step 294 with the step 160 in FIG. 17 setting the further target points, such as, $T_{P4}$---. Further, since the FS information is displayed on the display screen at a position corresponding to $D_{CP}$ and $D_{CPT}$, the display on the display screen looks like moving continuously.

As appreciated from the foregoing description about the second preferred embodiment, in cases a distance between $T_{P1}$ and $T_{P2}$ is short, i.e. within the preset value, the further forward target point $T_{P2}$ is also displayed on the display screen in addition to $T_{P1}$ either in the target point process or in the free running process. Accordingly, the vehicle driver can determine how to drive the car at the target point $T_{P1}$, taking the target point $T_{P2}$ into consideration.

Now, a third preferred embodiment will be described hereinbelow with reference to FIGS. 29 and 30.

Figure 3:
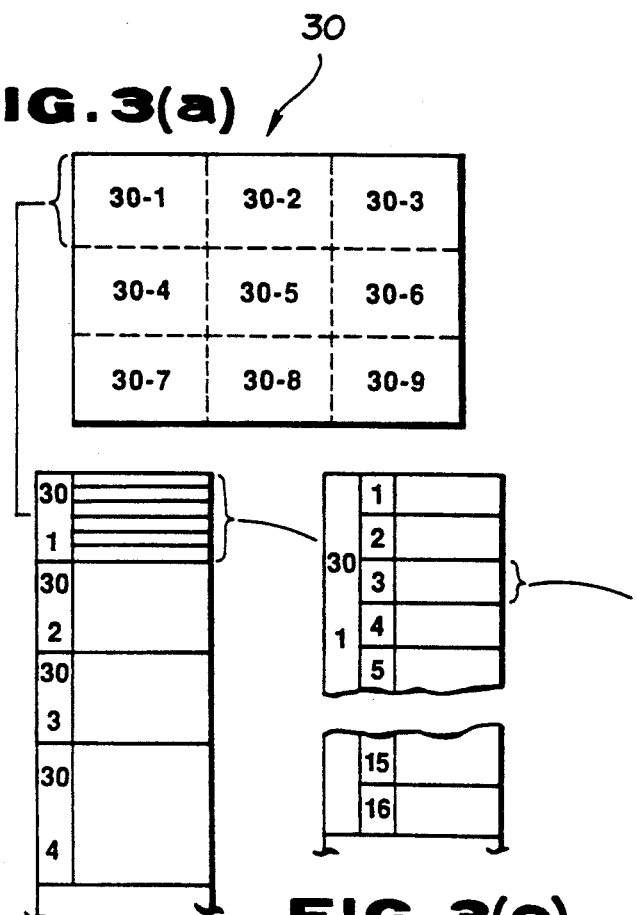
FIGS. 3 (a) to (d) show an example of the structure of road map data stored in a road map storage unit.
Figure 29:
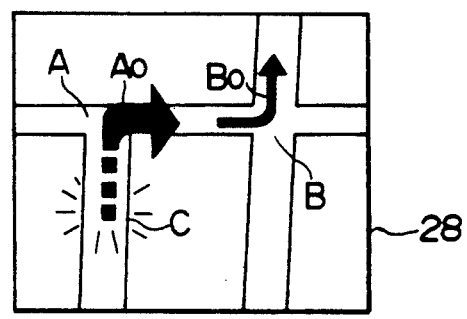
FIGS. 29 and 30 show a display example of navigation information according to the third preferred embodiment.
Figure 30:
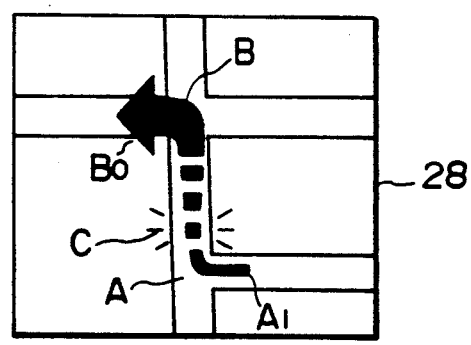

In FIGS. 29 and 30, it is assumed that target points A and B are intersections on the general road and that a distance between the target points A and B is short, such as, less than 500 m. In FIG. 29, assuming that the vehicle is traveling at a position C toward the target point B via the target point A, a direction indication $A_0$ for the target point A is displayed larger than a direction indication $B_0$ for the target point B. On the other hand, as shown in FIG. 3, after the vehicle has passed the target point A, the direction indication $B_0$ is displayed larger with a smaller indication of a vehicle travel route $A_1$ at the target point A.

As appreciated, in the third preferred embodiment, the vehicle driver can easily recognize a current position of the vehicle with respect to the target points A and B so that the smooth driving of the vehicle is ensured.

It is to be understood that this invention is not to be limited to the embodiments described above, and that various changes and modifications may be made without departing from the spirit and scope of the invention as defined in the appended claims.

What is claimed is:

1. A navigation system for an automotive vehicle, comprising:
   first means for storing first known target points and adjoining target points preselected for each of said first target points, said adjoining target points being preselected from said first target points;
   second means for storing a first data group associated with each of said first target points, each of said first data groups including a second data group corresponding to each of said adjoining target points of the corresponding first target point, each of said second data groups including an abstract configuration of said corresponding first target point and travel guidance information required at said corresponding first target point for going to the corresponding adjoining target point;
   third means for defining a travel route of the vehicle including second target points therein, said second target points being selected from said first target points;
   fourth means for storing said second target points;
   fifth means for setting third and fourth target points selected from said stored second target points, said third target point being a next forward target point for the vehicle along said travel route and said fourth target point being one of said adjoining target points of said third target point and being positioned forward of said third target point along said travel route;
   sixth means for monitoring a position of the vehicle;
   seventh means for monitoring a positional relationship between the monitored position of the vehicle and said third target point; and
   eighth means, responsive to said monitored positional relationship, for selecting one of said second data groups based on said third target point being used as the target point and said fourth target point being used as the adjoining target point so as to display, before the vehicle reaches said third target point, the corresponding travel guidance information such that said corresponding travel guidance information is superimposed on said abstract configuration of said third target point so as to form an integral image of said third target point by said corresponding travel guidance information and said abstract configuration of the third target point.

2. The system as set forth in claim 1, wherein said eighth means displays said corresponding travel guidance information by hatching on said abstract configuration of the third target point.

3. The system as set forth in claim 1, wherein said third target point is an intersection or a branch point on a road and said travel guidance information displayed on the abstract configuration of the third target point includes a direction and a lane to be selected by the vehicle at said third target point.

4. The system as set forth in claim 1, wherein said third target point is a lane change point and said travel guidance information displayed on the abstract configuration of the third target point includes a lane to be selected by the vehicle at said third target point.

5. The system as set forth in claim 1, wherein each of said first data groups includes a third data group corresponding to each of said adjoining target points of the corresponding first target point, each of said third data groups including guide sign data required at said corresponding first target point for going to the corresponding adjoining target point, and wherein said eighth means displays said guide sign data in a letter form along with said corresponding travel guidance information and said abstract configuration of the third target point.

6. The system as set forth in claim 1, wherein each of said first data groups includes a name of the corresponding first target point and wherein said eighth means displays the name of said third target point along with said corresponding travel guidance information and said abstract configuration of the third target point.

7. The system as set forth in claim 4, wherein said travel guidance information further includes an indication representative of a final lane change point, and said eighth means further includes ninth means for comparing a monitored vehicle speed with a first preset value, and wherein said eighth means displays said third target point with said indication being displayed at a lower portion on a display screen when said vehicle speed is larger than said first preset value.

8. The system as set forth in claim 7, wherein said eighth means further includes tenth means for comparing a monitored traffic volume with a second preset value, and wherein said eighth means displays said third target point with said indication being displayed at the lower portion on the display screen when said traffic volume is larger than said second preset value.

9. The system as set forth in claim 1, wherein said fifth means further sets a backward target point selected from said stored second target points, said backward target point being positioned backward of said third target point along said travel route and said third target point being one of said adjoining target points of said backward target point.

10. The system as set forth in claim 9, wherein each of said first data groups includes a fourth data group corresponding to each of said adjoining target points of the corresponding first target point, each of said fourth data groups including a free running information representative of the vehicle being allowed a free running, and wherein said eighth means selects said one of the second data groups for display from a time point when the vehicle enters a preset distance range from said third target point to a time point when the vehicle passes said third target point, while, said eighth means selects one of said fourth data groups based on said backward target point using as the target point and said third target point using as the adjoining target point so as to display said free running information when the vehicle is positioned out of said preset distance range from said third target point.

11. The system as set forth in claim 10, wherein each of said first data groups includes a fifth data group corresponding to each of said adjoining target points of the corresponding first target point, each of said fifth data groups including a further simplified configuration representative of said abstract configuration and said travel guidance of the corresponding second data group, and wherein said eighth means selects one of said fifth data groups based on said third target point using as the target point and said fourth target point using as the adjoining target point so as to display said further simplified configuration along with said free running information.

12. The system as set forth in claim 9, wherein said fifth means updates said backward target point, said third target point and said fourth target point every time the vehicle passes said third target point such that said third target point is set as said backward target point, said fourth target point is set as said third target point and a further forward target point selected from the stored second target points is set as said fourth target point, said further forward target point being positioned next to said fourth target point and being one of the adjoining target points of said fourth target point.

13. The system as set forth in claim 1, wherein each of said second data group further includes an abstract configuration of the corresponding adjoining target point, and wherein said eighth means displays the abstract configuration of said fourth target point in addition to said corresponding travel guidance information and said abstract configuration of the third target point.

14. The system as set forth in claim 2, wherein said eighth means provides a flickering display of said hatched travel guidance information when the vehicle enters a predetermined distance range from said third target point.

15. The system as set forth in claim 9, wherein said fifth means further sets a fifth target point selected from the stored second target points, said fifth target point being one of the adjoining target points of said fourth target point and being positioned forward of said fourth target point along said travel route, and wherein each of said first data groups includes a fifth data group corresponding to each of said adjoining target points of the corresponding first target point, each of said fifth data groups including a further simplified configuration representative of said abstract configuration and said travel guidance of the corresponding second data group, and wherein said eighth means includes eleventh means for comparing a first distance between the monitored position of the vehicle and said third target point with a preset distance, said first distance being monitored by said seventh means, and wherein said eighth means selects one of said fifth data groups based on said third target point using as the target point and said fourth target point using as the adjoining target point, said eighth means displaying said further simplified configuration on a display screen at a position corresponding to said first distance during the vehicle being out of a predetermined distance range from said third target point in case said first distance is no more than said preset distance, and wherein said eighth means includes twelfth means for deriving a second distance by adding said first distance to a stored distance between said third target point and said fourth target point and for comparing said second distance with said preset distance, and wherein said eighth means selects one of said fifth data groups based on said fourth target point using as the target point and said fifth target point using as the adjoining target point, said eighth means displaying said further simplified configuration identified by said fourth and fifth target points on the display screen at a position corresponding to said second distance in addition to said further simplified configuration identified by said third and fourth target points in case said second distance is no more than said preset distance.

* * * * *